United States Patent
Lee et al.

(10) Patent No.: US 10,237,882 B2
(45) Date of Patent: Mar. 19, 2019

(54) METHOD FOR SUPPORTING DISCONTINUOUS RECEPTION AND APPARATUS THEREFOR IN WIRELESS COMMUNICATION SYSTEM SUPPORTING RECONFIGURATION OF WIRELESS RESOURCE

(71) Applicant: LG ELECTRONICS INC., Seoul (KR)

(72) Inventors: Seungmin Lee, Seoul (KR); Inkwon Seo, Seoul (KR); Hanbyul Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/895,422

(22) PCT Filed: Jun. 26, 2014

(86) PCT No.: PCT/KR2014/005708
§ 371 (c)(1),
(2) Date: Dec. 2, 2015

(87) PCT Pub. No.: WO2014/209040
PCT Pub. Date: Dec. 31, 2014

(65) Prior Publication Data
US 2016/0119970 A1  Apr. 28, 2016

Related U.S. Application Data

(60) Provisional application No. 61/839,858, filed on Jun. 26, 2013, provisional application No. 61/839,856, (Continued)

(51) Int. Cl.
*H04W 76/04* (2009.01)
*H04W 72/12* (2009.01)
(Continued)

(52) U.S. Cl.
CPC ..... *H04W 72/1205* (2013.01); *H04L 41/0813* (2013.01); *H04W 24/08* (2013.01);
(Continued)

(58) Field of Classification Search
CPC .................................................. H04W 76/048
See application file for complete search history.

(56) References Cited

U.S. PATENT DOCUMENTS

2008/0045272 A1  2/2008  Wang et al.
2009/0249153 A1  10/2009  Zhang
(Continued)

FOREIGN PATENT DOCUMENTS

CN  101867406 A  10/2010
CN  102714812 A  10/2012
(Continued)

OTHER PUBLICATIONS

Pantech, "Counting rule of drx-retransmission timer," 3GPP TSG RAN WG2 Meeting #79, R2-123269, Qingdao, P.R. China, Aug. 13-17, 2012, pp. 1-4.
(Continued)

*Primary Examiner* — John D Blanton
(74) *Attorney, Agent, or Firm* — Birch, Stewart, Kolasch & Birch, LLP

(57) ABSTRACT

The present invention relates to a method for detecting control information of a terminal and an apparatus therefor in a wireless communication system supporting reconfiguration of a radio resource. Specifically, the present invention comprises the steps of: counting a discontinuous reception (DRX) timer in accordance with a first uplink-downlink configuration on a system information block (SIB) associated with a previously defined control channel; and monitoring the control channel on the basis of whether a radio resource reconfiguration message is received, wherein, if the
(Continued)

reception of the radio resource reconfiguration message is successful, then the control channel is monitored according to a second uplink-downlink configuration indicated by the radio resource reconfiguration message.

9 Claims, 25 Drawing Sheets

Related U.S. Application Data filed on Jun. 26, 2013, provisional application No. 61/863,985, filed on Aug. 9, 2013.

(51) Int. Cl.
*H04W 52/02* (2009.01)
*H04W 24/08* (2009.01)
*H04L 12/24* (2006.01)
*H04W 76/28* (2018.01)

(52) U.S. Cl.
CPC ... *H04W 52/0225* (2013.01); *H04W 52/0229* (2013.01); *H04W 72/1289* (2013.01); *H04W 76/28* (2018.02); *H04W 52/0216* (2013.01); *Y02D 70/00* (2018.01); *Y02D 70/1222* (2018.01); *Y02D 70/1224* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/23* (2018.01); *Y02D 70/24* (2018.01); *Y02D 70/25* (2018.01)

(56) References Cited

U.S. PATENT DOCUMENTS

| | | |
|---|---|---|
| 2011/0103326 A1 | 5/2011 | Kim et al. |
| 2011/0199910 A1* | 8/2011 | Oh .................... H04W 52/0229 370/241 |
| 2011/0255518 A9 | 10/2011 | Agrawal et al. |
| 2012/0044852 A1 | 2/2012 | Zhang et al. |
| 2012/0058791 A1 | 3/2012 | Bhattad et al. |
| 2013/0315114 A1 | 11/2013 | Seo et al. |
| 2013/0336299 A1 | 12/2013 | Lee et al. |
| 2014/0112263 A1 | 4/2014 | Lee et al. |
| 2014/0119261 A1 | 5/2014 | Wang et al. |
| 2014/0161002 A1 | 6/2014 | Gauvreau et al. |
| 2015/0282083 A1* | 10/2015 | Jeong ................ H04W 52/0216 370/311 |

FOREIGN PATENT DOCUMENTS

| | | |
|---|---|---|
| KR | 10-2007-0048678 A | 5/2007 |
| KR | 10-2010-0139062 A | 12/2010 |
| KR | 10-2012-0005515 A | 1/2012 |
| WO | WO 2010/049587 A1 | 5/2010 |
| WO | WO 2012/124923 A2 | 9/2012 |
| WO | WO 2012/128490 A2 | 9/2012 |
| WO | WO 2012/138149 A2 | 10/2012 |

OTHER PUBLICATIONS

3rd Generation Partnership Project, "Technical Specification Group Radio Access Network; Evolved Universal Terrestrial Radio Access (E-UTRA); Medium Access Control (MAC) Protocol Specification (Release 11)," 3GPP TS 36.321, V11.2.0, Mar. 2013, pp. 1-56.

* cited by examiner

FIG. 2
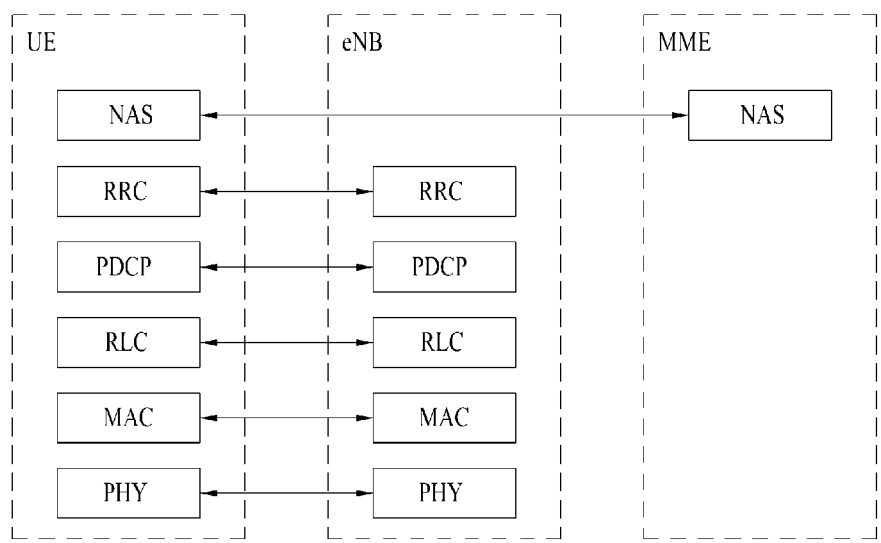
(a) Control-Plane Protocol Stack
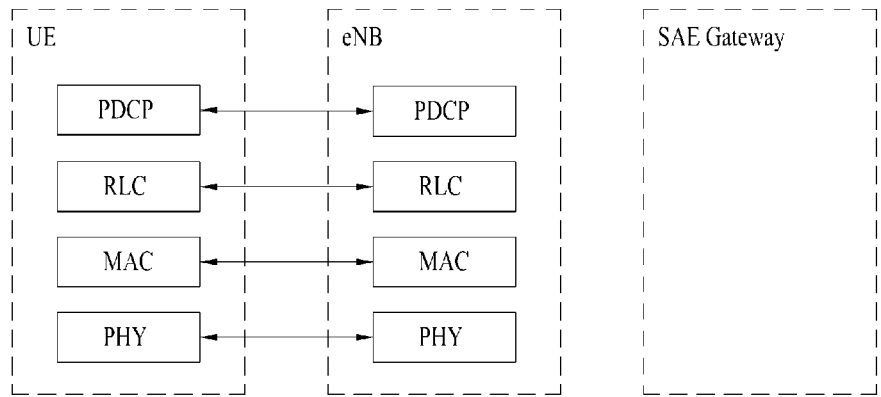
(b) User-Plane Protocol Stack

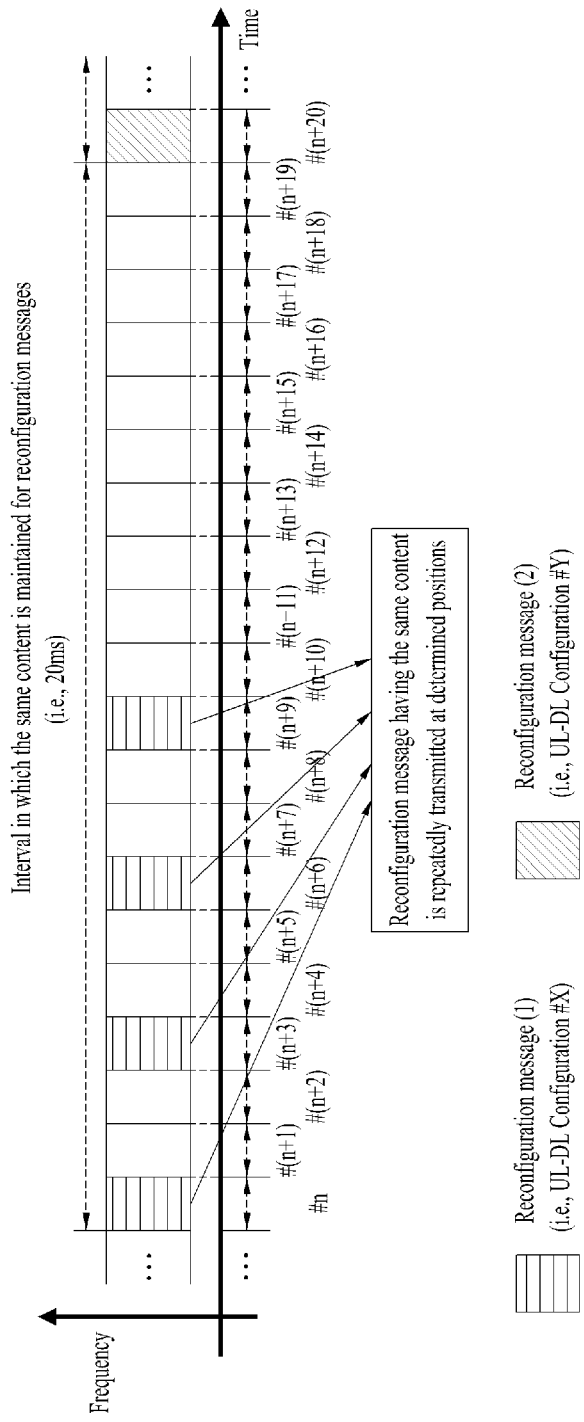

METHOD FOR SUPPORTING DISCONTINUOUS RECEPTION AND APPARATUS THEREFOR IN WIRELESS COMMUNICATION SYSTEM SUPPORTING RECONFIGURATION OF WIRELESS RESOURCE

CROSS REFERENCE TO RELATED APPLICATIONS

This application is the National Phase of PCT International Application No. PCT/KR2014/005708, filed on Jun. 26, 2014, which claims priority under 35 U.S.C. 119(e) to U.S. Provisional Application No. 61/839,858, filed on Jun. 26, 2013, 61/839,856, filed on Jun. 26, 2013 and 61/863,985, filed on Aug. 9, 2013, all of which are hereby expressly incorporated by reference into the present application.

TECHNICAL FIELD

The present invention relates to a wireless communication system and, more particularly, to a method for supporting discontinuous reception and an apparatus therefor in a wireless communication system supporting reconfiguration of radio resources.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

In order to assist an eNB and efficiently managing a wireless communication system, a UE periodically and/or aperiodically reports state information about a current channel to the eNB. The reported channel state information may include results calculated in consideration of various situations, and accordingly a more efficient reporting method is needed.

DISCLOSURE

Technical Problem

An object of the present invention devised to solve the problem lies in a method and apparatus for supporting discontinuous reception in a wireless communication system supporting reconfiguration of radio resources.

Objects of the present invention are not limited to the aforementioned objects, and other objects of the present invention which are not mentioned above will become apparent to those having ordinary skill in the art upon examination of the following description.

Technical Solution

The object of the present invention can be achieved by providing a method for a method for detecting control information by a terminal in a wireless communication system supporting reconfiguration of radio resources, the method including counting a discontinuous reception timer (DRX timer) according to a first uplink-downlink configuration on a system information Block (SIB) associated with a predefined control channel, and monitoring the control channel based on whether or not a radio resource reconfiguration message is received, wherein, when reception of the radio resource reconfiguration message is successful, the control channel is monitored according to a second uplink-downlink configuration indicated by the radio resource reconfiguration message.

The second UL-DL configuration may be reconfiguration of at least one radio resource according to the first UL-DL configuration. Preferably, the monitoring may include monitoring at least one of a downlink subframe and a special subframe indicated by the radio resource reconfiguration message.

When reception of the radio resource reconfiguration message is not successful, the control channel may be monitored according to the first UL-DL configuration. Preferably, the DRX timer may be counted based on at least one of a downlink subframe and a special subframe according to the first UL-DL configuration. Alternatively, the monitoring may include monitoring at least one of a downlink subframe and a special subframe according to the first UL-DL configuration.

The predefined control channel may be a physical downlink control channel (PDCCH) or an enhanced physical downlink control channel (EPDCCH).

The predefined control channel may be a physical downlink control channel (PDCCH) or an enhanced physical downlink control channel (EPDCCH).

The DRX timer may be one of onDurationTimer, drx-InactivityTimer and drx-RetransmissionTimer.

In another aspect of the present invention, provided herein is a terminal for detecting control information in a wireless communication system supporting reconfiguration of radio resources, the terminal including a radio frequency unit, and a processor, wherein the processor is configured to count a discontinuous reception timer (DRX timer) according to a first uplink-downlink configuration on a system information Block (SIB) associated with a predefined control channel, and to monitor the control channel based on whether or not a radio resource reconfiguration message is received, wherein, when reception of the radio resource reconfiguration message is successful, the control channel is monitored according to a second uplink-downlink configuration indicated by the radio resource reconfiguration message.

Advantageous Effects

According to embodiments of the present invention, discontinuous reception may be efficiently supported in a wireless communication system supporting reconfiguration of radio resources.

The effects that can be obtained from the present invention are not limited to the aforementioned effects, and other effects may be clearly understood by those skilled in the art from the descriptions given below.

DESCRIPTION OF DRAWINGS

The accompanying drawings, which are included to provide a further understanding of the invention, illustrate embodiments of the invention and together with the description serve to explain the principle of the invention.

FIG. 2 illustrates a control plane and user plane of a radio interface protocol between a User Equipment (UE) and an Evolved Universal Terrestrial Radio Access Network (E-UTRAN) based on the 3rd Generation Partnership Project (3GPP) radio access network standard.

BEST MODE

Figure 1:
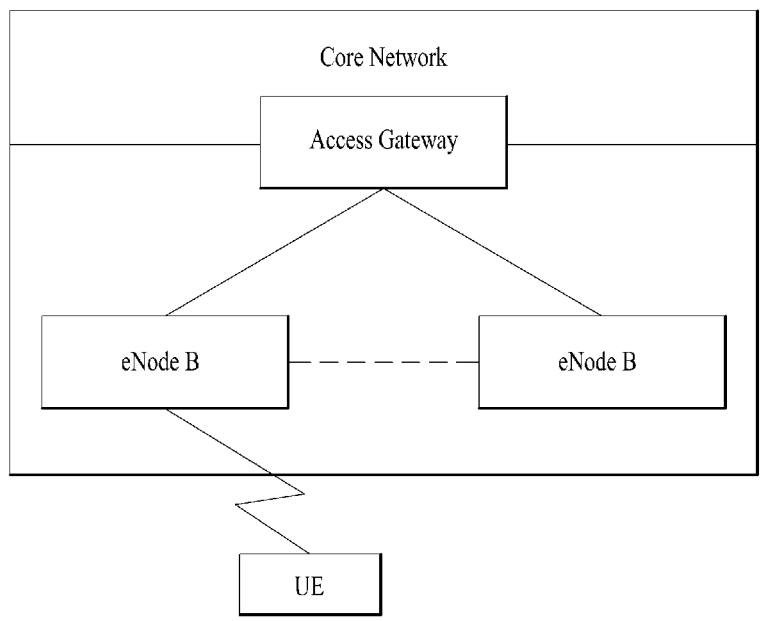
FIG. 1 schematically illustrates an E-UMTS network architecture as an example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
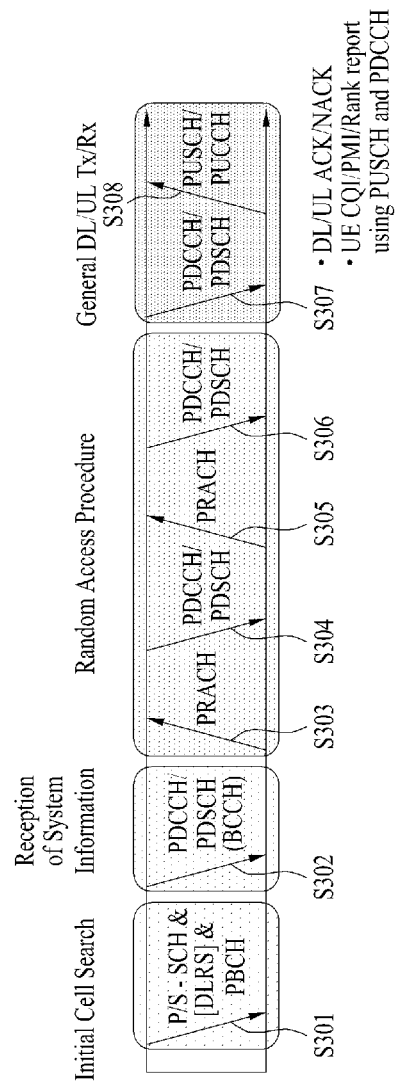
FIG. 3 illustrates physical channels used in a 3GPP system and a typical signal transmission method using the same.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
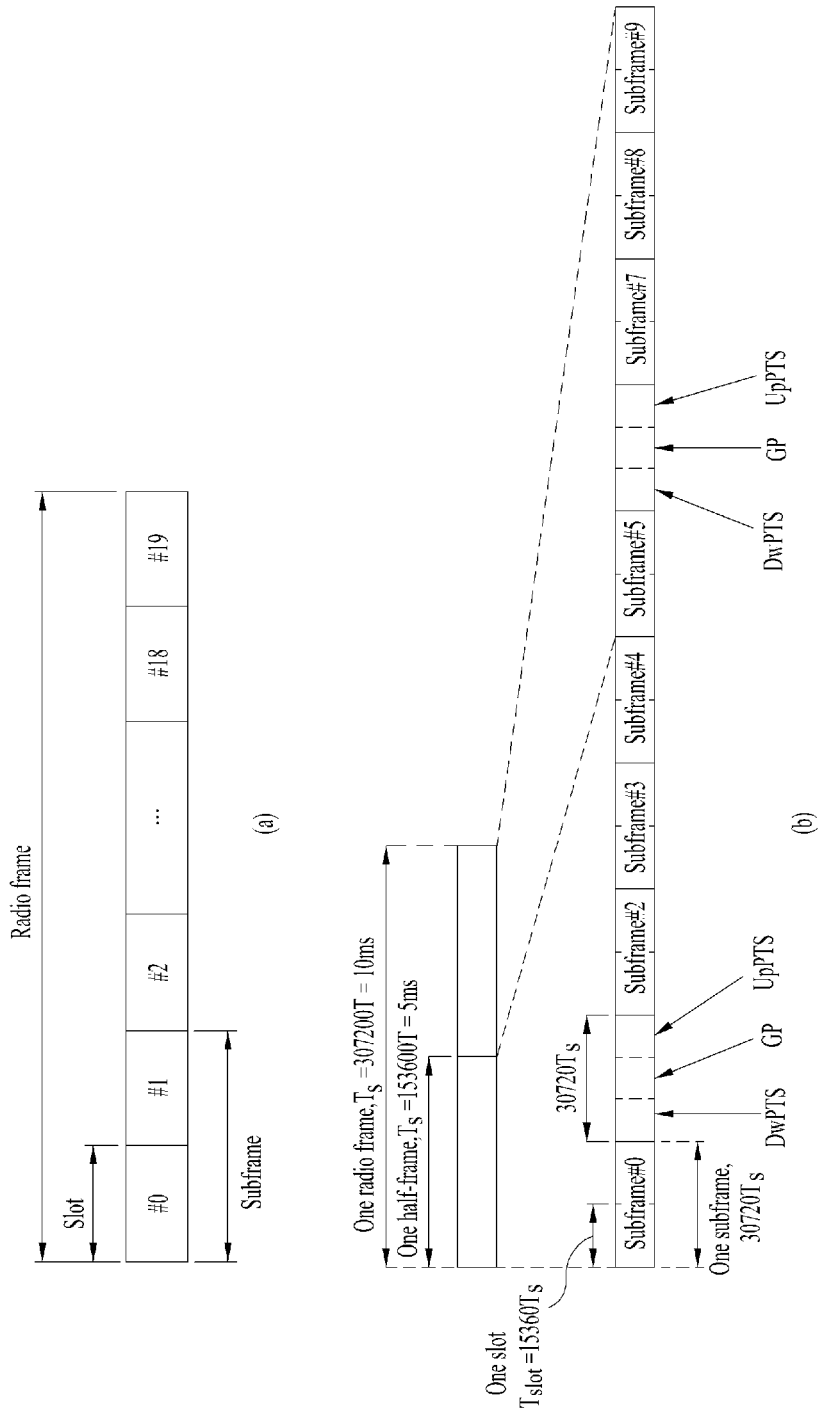
FIG. 4 illustrates the structure of a radio frame used in a Long Term Evolution (LTE) system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PUSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
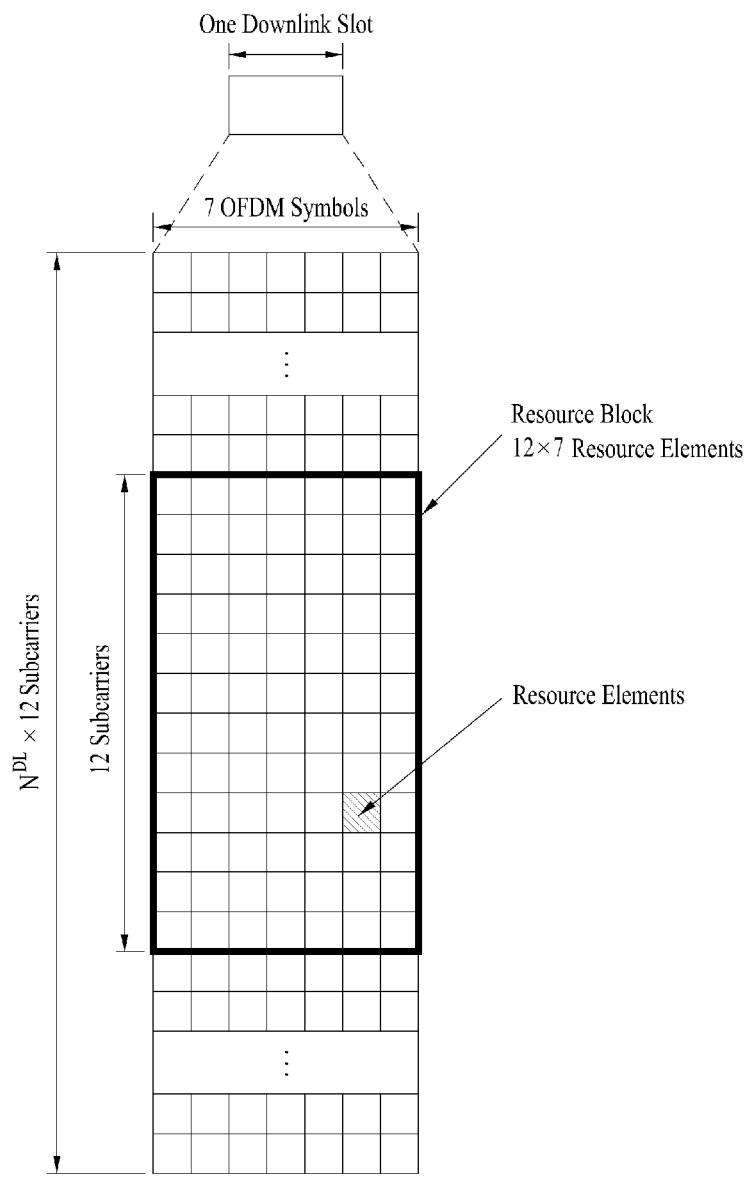
FIG. 5 illustrates a resource grid for a DL slot.

FIG. 5 illustrates a resource grid for a DL slot.

Referring to FIG. 5, a DL slot includes $N_{symb}^{DL}$ OFDM symbols in the time domain and $N_{RB}^{DL}$ resource blocks (RBs) in the frequency domain. Since each RB includes $N_{sc}^{RB}$ subcarriers, a DL slot includes $N_{RB}^{DL} \times N_{sc}^{RB}$ subcarriers in the frequency domain. While FIG. 5 illustrates that a DL slot includes 7 OFDM symbols and an RB includes 12 subcarriers, embodiments of the present invention are not limited thereto. For example, the number of OFDM symbols included in a DL slot may be changed according to the length of a cyclic prefix (CP).

Each element in the resource grid is referred to as a resource element (RE). Each RE is indicated by an OFDM symbol index and a subcarrier index. One RB consists of $N_{symb}^{DL} \times N_{sc}^{RB}$ REs. The number of RBs ($N_{RB}^{DL}$) included in a DL slot depends on a DL transmission bandwidth set in a cell.

Figure 6:
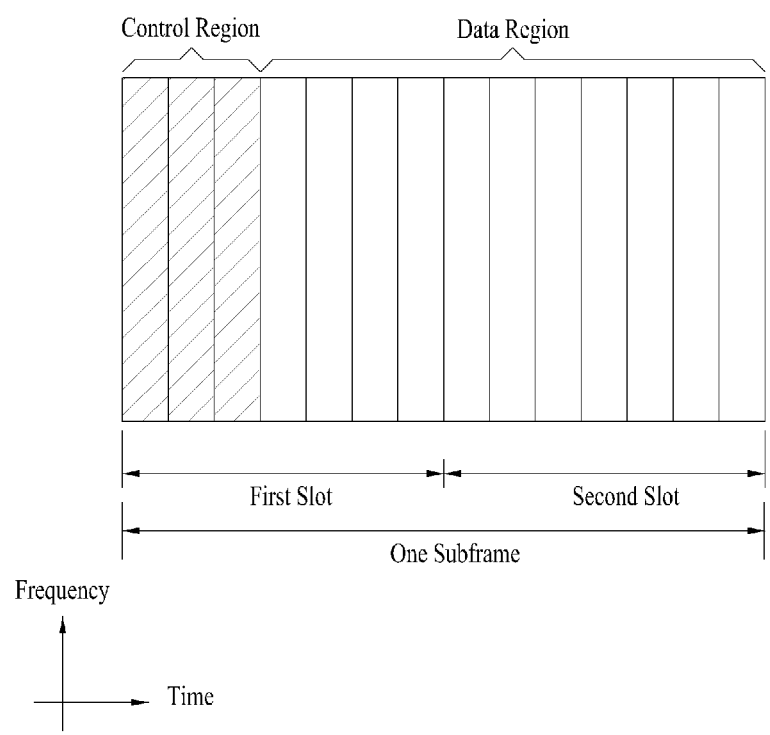
FIG. 6 illustrates the structure of a DL subframe.

FIG. 6 illustrates the structure of a DL subframe.

Referring to FIG. 6, up to three or four OFDM symbols positioned at the front part of the first slot in a subframe correspond to a control region to which control channels are allocated. The other OFDM symbols in the subframe correspond to a data region to which a physical downlink shared channel (PDSCH) is allocated. Examples of the aquifer channels used in LTE include a physical control format indicator channel (PCFICH), a physical downlink control channel (PDCCH), and a physical hybrid ARQ indicator channel (PHICH). The PCFICH is transmitted in the first OFDM symbol of a subframe, carrying information about the number of OFDM symbols used for transmission of control channels in the subframe. The PHICH carries a HARQ acknowledgment (ACK)/negative-acknowledgment (NACK) signal in response to UL transmission HARQ ACK/NACK.

Control information carried on the PDCCH is called downlink control information (DCI). The DCI includes resource allocation information and other control information for a UE or a UE group. For example, the DCI includes DL/UL scheduling information, UL transmit (Tx) power control commands, etc.

The PDCCH carries information about resource allocation and a transmission format for a downlink shared channel (DL-SCH), information about resource allocation and a transmission format for an uplink shared channel (UL-SCH), paging information on a paging channel (PCH), system information on the DL-SCH, information about resource allocation for a higher-layer control message such as a random access response transmitted on the PDSCH, a Tx power control command set for individual UEs in a UE group, Tx power control commands, voice over Internet protocol (VoIP) activation indication information, etc. A plurality of PDCCHs may be transmitted in the control region. A UE may monitor a plurality of PDCCHs. A PDCCH is transmitted on an aggregation of one or more consecutive control channel elements (CCEs). A CCE is a logical allocation unit used to provide a PDCCH with a coding rate based on the state of a radio channel. A CCE corresponds to a plurality of resource element groups (REGs). The format of a PDCCH and the number of PDCCH bits are determined according to the number of CCEs. An eNB determines a PDCCH format according to DCI transmitted to a UE and adds cyclic redundancy check (CRC) to control information. The CRC is masked with an identifier (ID) (e.g. a radio network temporary identifier (RNTI)) according to the owner or use of the PDCCH. For example, if the PDCCH is intended for a specific UE, the CRC may be masked with the ID (e.g., cell-RNTI (C-RNTI)) of the specific UE. If the PDCCH is intended for a paging message, the CRC thereof may be masked with a paging ID (e.g., paging-RNTI (P-RNTI)). If the PDCCH is intended for system information (particularly, a system information block (SIB)), the CRC thereof may be masked with a system information RNTI (SI-RNTI). If the PDCCH is intended for a random access response, the CRC thereof may be masked with a random access-RNTI (RA-RNTI).

Figure 7:
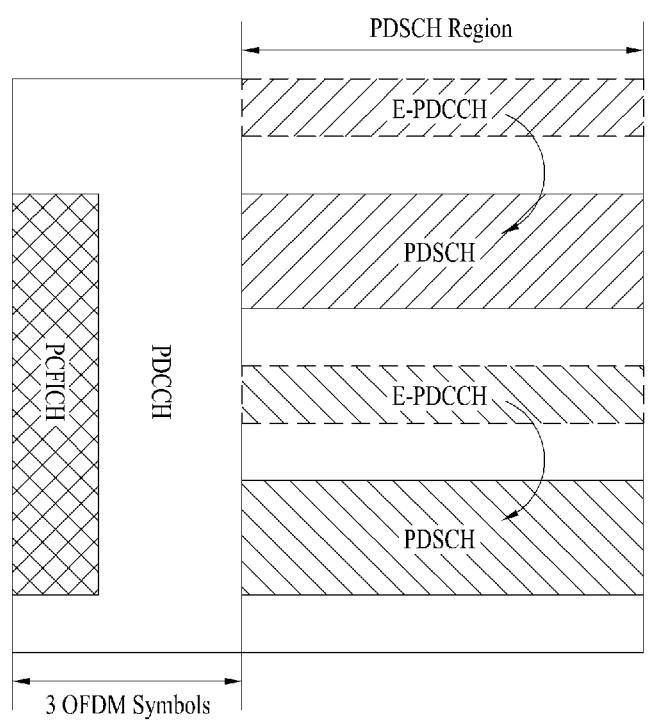
FIG. 7 is a diagram illustrating a PDSCH scheduled by an EPDCCH and an EPDCCH.

FIG. 7 is a diagram illustrating an EPDCCH and a PDSCH scheduled by the EPDCCH.

Referring to FIG. 7, a part of the PDSCH region for transmission of data may be generally defined and used for EPDCCHs, and a UE needs to perform blind decoding to detect whether or not the EPDCCH thereof exists. The EPDCCH performs the same scheduling operation (i.e., controlling the PDSCH and PUSCH) as the legacy PDCCH. However, as the number of UEs accessing a node such as an RRH increases, the number of the EPDCCHs allocated in the PDSCH region increases, and thus the number of times of blind decoding to be performed by a UE increases. Thereby, complexity may be increased.

Hereinafter, discontinuous reception (DRX) will be described.

In order to reduce consumption of battery power of a UE, the UE may perform a DRX operation and/or DTX operation. A UE performing DRX repeatedly turns on and off the reception performance thereof, and a UE performing DTX repeatedly turns on and off the transmission performance thereof. The present invention is associated with the DRX operation. Hereinafter, the DRX operation will be described in more detail. Terms used in describing embodiments of the present invention related to the DRX operation are defined as follows.

- Active Time: A time associated with DRX. A UE mentors a PDCCH in a PDCCH-subframe for the active time.
- mac-ContentionResolutionTimer: A parameter specifying the number of consecutive subframes in which a UE should monitor a PDCCH after Msg3 is transmitted.
- DRX Cycle: A parameter specifying periodic repetition of On Duration accompanied by a possible period of inactivity.
- drx-InactivityTimer: A parameter specifying the number of consecutive PDCCH-subframes after successful decoding of a PDCCH indicating initial UL or DL user transmission for a UE.
- drx-RetransmissionTimer: A parameter specifying the maximum number of PDCCH-subframes in which DL retransmission is expected by a UE.
- drxShortCycleTimer: A parameter specifying the number of consecutive subframes in which a UE should comply with a short DRX cycle.
- drxStartOffset: A parameter specifying a subframe in which the DRX cycle begins.
- HARQ RTT (Round Trip Time) timer: A parameter specifying the minimum number of subframes before DL HARQ retransmission is expected by a UE.
- Msg3: A message which is provided from a higher layer, associated with a UE contention resolution identity, and transmitted on an uplink shared channel (UL-SCH) including a C-RNTI medium access control (MAC) control element (CE) or a common control channel (CCCH) service data unit (SDU) as a part of a random access procedure.
- onDurationTimer: A parameter specifying the number of consecutive PDCCH-subframes at the start of DRX.
- PDCCH-subframe: A subframe having a PDCCH or a subframe having an R-PDCCH for a relay node (RN) having an R-PDCCH which is configured but not suspended. The PDCCH-subframe may represent any subframe for an FDD UE behavior and may represent only a DL subframe and a subframe including DwPTS for a TDD UE behavior. For RNs having an RN subframe configuration which is configured but is not suspended, the PDCCH-subframe may represent all DL subframes configured for RN communication with E-UTRAN.

Once the aforementioned timers start, the timers run until they stop or expire. Otherwise, the timers do not run. The timers may start if they are not running, and may be resumed if they are running. The timers always start or restart within an initial value.

DRX refers to a technique of reducing battery power consumption of a UE by allowing the UE to discontinuously receive a DL channel. For example, once DRX is configured, a UE may attempt to receive a PDCCH only in a determined time interval, and does not attempt to receive the PDCCH during the other time intervals. The time interval in which the UE needs to attempt to receive the PDCCH is called the On Duration. The On Duration is defined once per DRX Cycle.

The UE attempts to receive a PDCCH at least during On Duration in one DRX cycle. The DRX cycle used at this time is divided into a long DRX cycle and a short DRX cycle according to the length thereof. The long DRX cycle, which represents a long period, may minimize battery power consumption of the UE, and the short DRX cycle, which represents a short period, may minimize data transmission delay.

If the UE receives a PDCCH during the On Duration, additional transmission or retransmission may occur in a time interval other than the On Duration. Accordingly, the UE should attempt to receive a PDCCH in a time interval where transmission or transmission may occur even if the time interval is not the On Duration. That is, the UE attempts to receive a PDCCH in a time interval in which onDurationTimer for managing the On Duration, drx-InactivityTimer for managing inactivity or drx-RetransmissionTimer for managing retransmission is running. Additionally, when the UE is performing random access or attempts to receive a UL grant after sending a scheduling request, the UE attempts to receive a PDCCH carrying the UL grant. The time interval in which the UE should attempt to receive a PDCCH is called an activity time. The activity time includes On Duration, which is a time interval in which the UE periodically attempts to receive a PDCCH, and a time interval in which the UE attempts receive a PDCCH when an event occurs.

Figure 8:
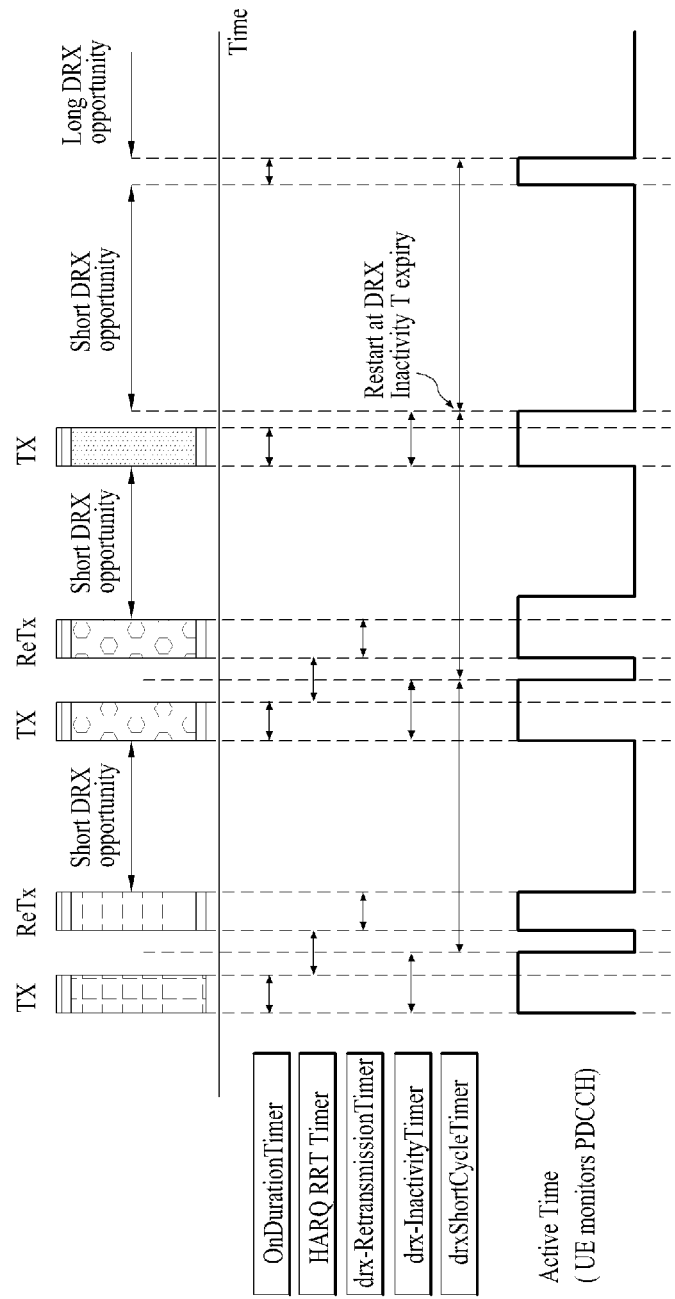
FIG. 8 illustrates a discontinuous reception (DRX) operation in a 3GPP LTE system.

FIG. 8 illustrates a discontinuous reception (DRX) operation in a 3GPP LTE system.

The UE may be configured by RRC with DRX functionality that controls the UE's PDCCH monitoring activity for a cell radio network temporary identifier (C-RNTI), which is unique identification information used to identify RRC connection and scheduling, a transmit power control-physical uplink control channel-RNTI (TPC-PUCCH-RNTI), which is identification information used to control power of PUCCH, a transmit power control-physical uplink shared channel-RNTI (TPC-PUSCH-RNTI), which is identification information used to control power of PUSCH, and semi-persistent scheduling C-RNTI (if configured), which is unique identification information used for semi-persistent scheduling. If DRX is configured in RRC_Connected, the UE is allowed to monitor the PDCCH discontinuously using the DRX operation. When using DRX operation, the UE discontinuously monitors PDCCH according to conditions which will be described later. RRC controls the DRX operation by configuring timers such as onDurationTimer, drx-InactivityTimer, drx-RetransmissionTimer, longDRX-Cycle, drx start offset, drxShortCycleTimer, and shortDRX-Cycle. A HARQ RTT timer per DL HARQ process is also defined. The HARQ RTT timer is set to 8 ms, and the other timer values (e.g., onDurationTimer, drx-InactivityTimer, drx-RetransmissionTimer or mac-ContentionResolutionTimer) are configured by the eNB through RRC signaling. The long DRX cycle and the short DRX cycle are also configured by the eNB through RRC signaling. Meanwhile, the eNB uses cqi-Mask, which has a value set by a higher layer (e.g., an RRC layer), to limit reporting of CQI/PMI/PTI/RI from the UE to On Duration of the DRX Cycle. The eNB may transmit a DRX Command MAC CE to the UE to command the UE to transition to the DRX state. As described below, upon receiving the DRX Command MAC CE from the eNB, the UE transitions to a short DRX state if a short DRX cycle is configured. Otherwise, the UE transitions to a long DRX state. The DRX Command MAC CE is identified through the logical channel ID (LCID) of a MAC PDU subheader.

When a DRX cycle is configured, the activity time includes the following time intervals:
  a time for which onDurationTimer, drx-InactivityTimer, drx-RetransmissionTimer or mac-ContentionResolutionTimer runs;
  a time for which a scheduling request is over a PUCCH and is pending;
  a time for which a UL grant for pending HARQ retransmission may occur and a corresponding HARQ buffer has data; or
  a time taken until a PDCCH instructing initial transmission of new data corresponding to the C-RNTI of the UE is received after successful reception of a random access response to a preamble which is not selected by the UE.

When DRX is configured, the UE should perform the following operations for each subframe:
  If the HARQ RTT timer expires in this subframe and the data in a soft buffer of the corresponding HARQ process is not successfully decoded,
    the UE starts the drx-RetransmissionTimer for the corresponding HARQ process;
  If a DRX Command MAC control element is received,
    onDurationTimer is stopped; and
    drx-InactivityTimer is stopped;
  If drx-InactivityTimer expires or a DRX Command MAC CE is received in this subframe:
    when the Short DRX Cycle is configured:
      drxShortCycleTimer starts or restarts;
      the Short DRX Cycle begins.
    Else,
      a Long DRX Cycle is used.
  If drxShortCycleTimer expires in this subframe,
    the Long DRX Cycle is used.
  If the Short DRX Cycle is used and [(SFN*10)+subframe number] modulo (shortDRX-Cycle)=(drxStartOffset) modulo (shortDRX-Cycle); or
  if the Long DRX Cycle is used and [(SFN*10)+subframe number] modulo (longDRX-Cycle)=drxStartOffset,
    the UE starts onDurationTimer.
  For a PDCCH-subframe, if the subframe is neither required for uplink transmission for half-duplex FDD UE operation, nor a part of a configured measurement gap during the Active Time,
    the UE monitors the PDCCH.
    If the PDCCH indicates DL transmission or DL assignment has been configured for this subframe,
      the UE starts the HARQ RTT Timer for the corresponding HARQ process; and the UE stops the drx-RetransmissionTimer for the corresponding HARQ process.

If the PDCCH indicates new (DL or UL) transmission, the UE starts or restarts drx-InactivityTimer.

When the UE is not in the Active Time, type-0-triggered SRS should not be reported.

If CQI masking (cqi-Mask) is set up by a higher layer, when onDurationTimer is not running, CQI (Channel Quality Indicator)/PMI (Precoding Matrix Indicator)/RI (Rank Indicator)/PTI (Precoding Type Indicator) on PUCCH should not be reported.

Else, when the UE is not in the Active Time, CQI/PMI/RI/PTI on PUCCH should not be reported.

Regardless of whether or not the UE is monitoring the PDCCH, the UE receives and transmits HARQ feedback and transmits a type-1-triggered SRS when the PDCCH is expected.

NOTE: The UE may optionally choose not to send CQI/PMI/RI/PTI reports on PUCCH and/or type-0-triggered SRS transmission for up to 4 subframes following a PDCCH indicating new (UL or DL) transmission. Choosing not to send CQI/PMI/RI/PTI reports on PUCCH and/or type-0-triggered SRS transmission is not applicable to subframes in which onDurationTimer is running.

NOTE: The same active time is applied to resources operating on all activated serving carriers.

The present invention proposes a method for efficiently supporting reconfiguration of radio resources in consideration of DRX configuration of a UE and a method for a BS to efficiently transmit a radio resource reconfiguration message to the UE. Herein, the reconfiguration message may be defined in the higher layer signal form (e.g., SIB/PBCH/MAC/RRC) or a physical layer signal form (e.g., PDCCH/EPDCCH/PDSCH). The reconfiguration message may be UE-specific, cell-specific, UE-group-specific, or UE-group-common. Additionally, the reconfiguration message may be transmitted through a UE-specific search space (USS) or a common search space (CSS).

Hereinafter, embodiments will be described based on a 3GPP LTE system for simplicity of description. However, the present invention is applicable to systems other than the 3GPP LTE system.

In addition, embodiments of the present invention are also applicable when resources on a specific cell or a specific component carrier (CC) are dynamically changed according to system load in an environment where carrier aggregation (CA) is applied. In addition, embodiments of the present invention are also applicable when configuration of radio resources are dynamically changed in a TDD system, FDD system or TDD/FDD combined system. Hereinafter, for simplicity of description of the embodiments, it is assumed that each cell dynamically reconfigures legacy radio resources in a TDD system environment according to system load thereof.

Further, the legacy radio resources may be divided into two types according to dynamic reconfiguration of the radio resources.

For example, the legacy radio resources may be divided into a resource set having a static (or fixed) configuration (i.e., a static resource set) and a resource set whose configuration is dynamically changed (i.e., a flexible resource set). For example, a resource set having the same configuration (continuously used for the same purpose) as a UL-DL configuration on an SIB may be defined as the static resource set, and a resource set having a different configuration (or likely to be used for a different purpose) from the UL-DL configuration on the SIB may be defined as a flexible resource set.

In another example, a resource set having the same configuration (or continuously used for the same purpose) as a UL-DL configuration established at the previous reconfiguration time (e.g., in a reconfiguration manner based on a predefined reconfiguration period) may be defined as the static resource set, and a resource set having a different configuration (or likely to be used for a different purpose) from the UL-DL configuration established at the previous reconfiguration time may be defined as the flexible resource set.

In another example, a resource set having the same configuration (or continuously used for the same purpose) as a UL-DL configuration of a predefined reference DL HARQ timeline (or reference UL HARQ timeline) may be defined as the static resource set, and a resource set having a different configuration (or likely to be used for a different purpose) from the UL-DL configuration of the reference DL HARQ timeline (or the reference UL HARQ timeline) may be defined as the flexible resource set.

Herein, the reference DL/UL HARQ timeline is a HARQ timeline established in order to maintain a stable HARQ timeline regardless of (re-)change of the UL-DL configuration. The reference DL/UL HARQ timeline may be defined as a DL/UL HARQ timeline of a UL-DL configuration including one of i) a union/intersection of DL subframes, ii) a union of DL subframes/UL subframes, iii) an intersection of DL subframes/UL subframes, iv) an intersection of DL subframes/union of UL subframes of reconfigurable UL-DL configuration candidates.

Figure 9:
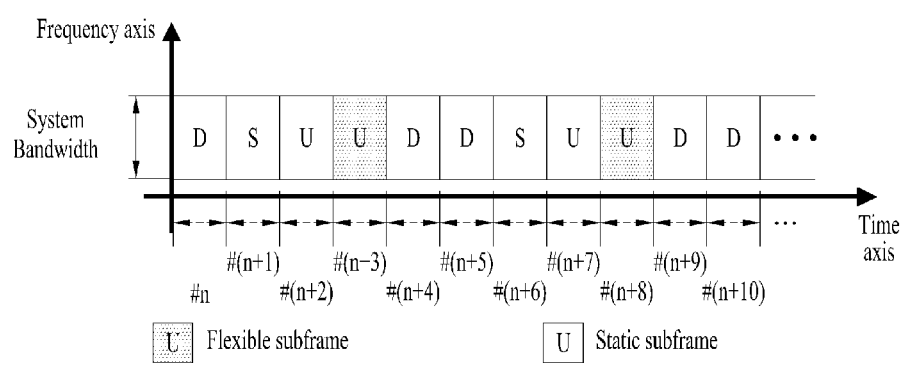
FIG. 9 illustrates division of legacy subframes into a static subframe set and a flexible subframe set in a TDD system environment.

FIG. 9 illustrates division of legacy subframes into a static subframe set and a flexible subframe set in a TDD system environment. In FIG. 9, a legacy UL-DL configuration established through a system information block (SIB) signal is assumed to be UL-DL configuration #1 (i.e., DSUUDDSUUD), and an eNB is assumed to announce reconfiguration information about the rations of radio resources to a UE through a predefined signal.

Before embodiments of the present invention are described in detail, DRX configuration of a legacy UE will be discussed first. The eNB may UE-specifically configure DRX according to whether or not there is DL data to be transmitted to the corresponding UEs, which has been described in detail above. For details, refer to LTE/LTE-A standard documents including 3GPP TS 36.321 and 3GPP TS 36.331. In addition, as described above, counting of DRX operation-related specific timers is performed based on the PDCCH-subframe(s). It should be understood that the present invention covers a case where a UL subframe for DL use reconfigured by a reconfiguration message is set to perform counting of the DRX operation-related timers and a case where the UL subframe is interpreted as a subframe for monitoring PDCCH/EPDCCH (i.e., the UL subframe is not involved in counting of a specific DRX operation-related timer).

In the present invention, the radio resource reconfiguration message may be used to signal configurations of radio resources appearing i) at and after the time at which the reconfiguration message is received, ii) after the time at which the reconfiguration message is received, or iii) when a predefined time (i.e., a subframe offset) passes after the time at which the reconfiguration message is received, according to a predefined rule.

Accordingly, there is a need for clear definition of i) a method for a UE to receive the reconfiguration message with a high success probability, ii) a method for implementing fallback for a UL-DL configuration of the UE when the reconfiguration message is not successfully received (e.g., when the result of cyclic redundancy check (CRC) for the received reconfiguration message is False), iii) a method for allowing the UE to monitor or receive the reconfiguration message in any situation (e.g., DRX), iv) a method for allowing the UE to recognize missing of reception of the reconfiguration message, or v) a method for allowing the UE to recognize a situation in which the result of CRC implemented on the reconfiguration message is True, but corresponding information is not correctly delivered/detected (namely, False Alarm is produced) (e.g., when a DL subframe on an SIB is configured not to be changed to a UL subframe in consideration of the RRM/RLM operation of the legacy UE, but the reconfiguration message detected by the UE instructs the DL subframe on the SIB to be changed to a UL subframe).

Figure 10:
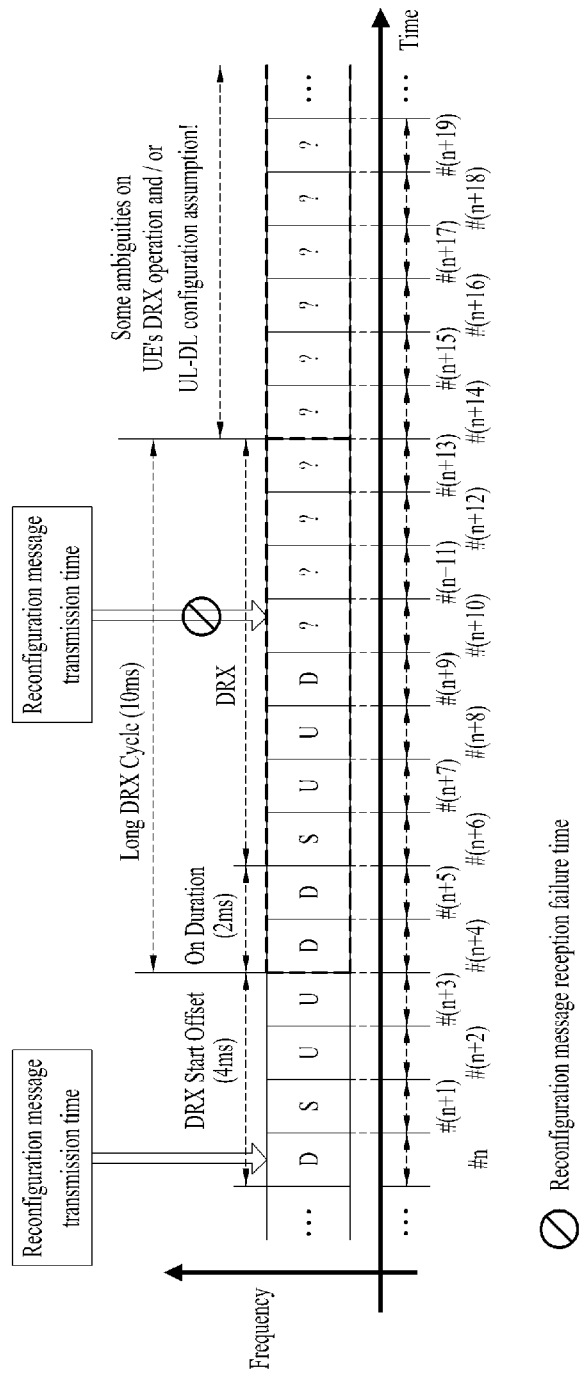
FIG. 10 illustrates a case where a UE fails to receive a reconfiguration message from an eNB due to DRX configuration.

FIG. 10 illustrates a case where a UE fails to receive a reconfiguration message from an eNB due to DRX configuration. In FIG. 10, it is assumed that the legacy UL-DL configuration established through an SIB signal is UL-DL configuration #1 (i.e., DSUUDDSUUD) and that the eNB transmits a reconfiguration message to the UE based on a predefined period (e.g., 10 ms) and signal form. In addition, it is assumed that the Long DRX Cycle, onDurationTimer, and DRX Start Offset are set to 10 ms, 2 ms, and 4 ms, respectively.

In FIG. 10, it is assumed that the UE has not received, from the eNB, DL/UL data communication (PDSCH/PUSCH)-related DL/UL scheduling information (DL Grant/UL Grant) in the On Duration interval (i.e., the interval from SF #(n+4) to SF #(n+5)). Thereby, the DRX operation (for PDCCH Monitoring Activity (for UE's C-RNTI, TPC-PUCCH-RNTI, TPC-PUSCH-RNTI and SPS C-RNTI)) is performed in the remaining interval of the Long DRX Cycle (i.e., the interval from SF #(n+6) to SF #(n+13)). Herein, as the reconfiguration message transmitted based on the predefined period (i.e., 10 ms) is transmitted at a specific time (i.e., SF #(n+10)) in the remaining interval of the Long DRX Cycle (i.e., the interval from SF #(n+6) to SF #(n+13)), the UE may fail to successfully receive the reconfiguration message.

Accordingly, the present invention proposes a method for efficiently supporting reconfiguration of radio resources in consideration of DRX configuration of a UE and a method for an eNB to efficiently transmit a radio resource reconfiguration message to the UE in consideration of the DRX configuration.

Embodiment 1

The legacy DRX operation determines whether or not to perform PDCCH monitoring related to a predefined specific RNTI (i.e., C-RNTI, TPC-PUCCH-RNTI, TPC-PUSCH-RNTI, SPS C-RNTI) of a UE. Therefore, according to the first embodiment of the present invention, monitoring a specific country channel related to an RNTI of a reconfiguration message may be constantly performed regardless of the DRX configuration or DRX operation of the UE.

Herein, the specific country channel may be defined as a (legacy) PDCCH and/or EPDCCH. Information about an RNTI used for (blind) detection/decoding of the reconfiguration message may be additionally announced to the UE by the eNB through a predefined signal (e.g., a higher layer signal or a physical layer signal) or a specific legacy RNTI (e.g., C-RNTI, TPC-PUCCH-RNTI, TPC-PUSCH-RNTI, SPS C-RNTI) may be reused.

Accordingly, in this embodiment, monitoring of the specific control channel related to an RNTI of the reconfiguration message is similar to monitoring of a specific control channel (e.g., PDCCH) related to legacy SI-RNTI or P-RNTI (namely, the UE constantly performs monitoring of a specific control channel related to the SI-RNTI or P-RNTI at a subframe time at which predefined system information or paging information is transmitted).

In addition, subframes in which the UE performs monitoring of a specific control channel (related to the RNTI of the reconfiguration message) to receive/blind-detect the reconfiguration message may be configured by i) downlink subframes on an SIB and/or special subframes including DwPTS, ii) downlink subframes and/or special subframes on the UL-DL configuration of a (predefined) reference UL HARQ timeline, iii) downlink subframes and/or special subframes on the UL-DL configuration of a (predefined) reference DL HARQ timeline, or iv) downlink subframes and/or special subframes configured by the reconfiguration message.

Figure 11:
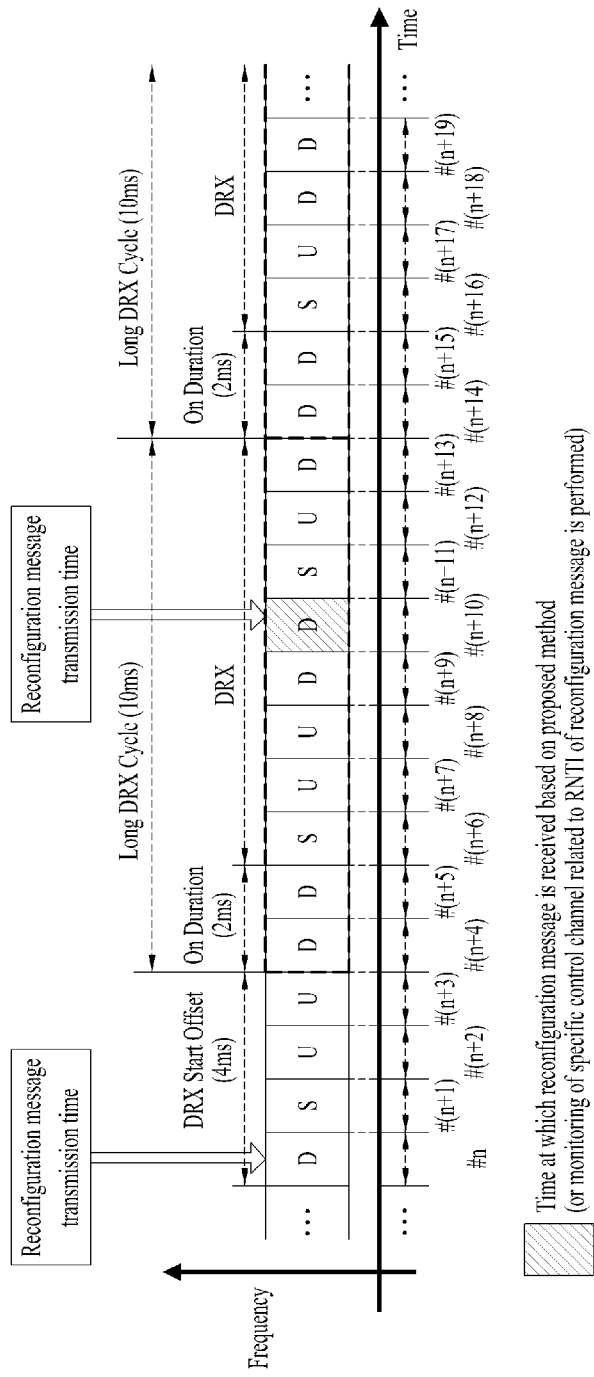
FIG. 11 is a reference diagram illustrating a first embodiment of the present invention.

FIG. 11 illustrates application of this embodiment in the same situation as in FIG. 10. As shown in FIG. 11, in contrast with the case of FIG. 10, the UE may receive a reconfiguration message (and thus change from UL-DL configuration #1 (i.e., DSUUDDSUUD) to UL-DL configuration #2 (i.e., DSUDDDSUDD)) transmitted at the time corresponding to SF #(n+10).

Embodiment 2

According to a second embodiment, if a UE has failed to successfully receive a reconfiguration message due to DRX operation or DRX configuration, the UE may perform fallback to a UL-DL configuration on an SIB, fallback to a UL-DL configuration of a (predefined) reference UL HARQ timeline, or fallback to a UL-DL configuration of a (predefined) reference DL HARQ timeline.

The proposed method may be applied to, for example, a case where the result of CRC performed on a received reconfiguration message turns out to be False, a case where the reconfiguration message is missed, or a case where the result of CRC performed on the received reconfiguration message turns out to be True, but the corresponding information is not correctly delivered (i.e., False Alarm) (e.g., if a reconfiguration message detected by the UE instructs change of a DL subframe on an SIB to a UL subframe although a rule has been applied such that the DL subframe on the SIB does not change to a UL subframe (in consideration of the RRM/RLM operation of a legacy UE), False Alarm may be determined).

According to this embodiment, DRX-related specific timers (i.e., onDurationTimer, drx-InactivityTimer, and drx-RetransmissionTimer) may be counted in consideration of a DL subframe and/or a special subframe in which a predetermined control channel on a UL-DL configuration defined as fallback is transmitted.

According to this embodiment, subframes in which the UE performs blind detection of DL scheduling information (DL Grant) or UL scheduling information (UL Grant) (related to initial transmission and/or retransmission) may be limited to i) a set of DL subframes/special subframes in which a predefined control channel on a UL-DL configuration defined as fallback is transmitted or ii) DL subframes/special subframes in which a predefined control channel on a UL-DL configuration defined as fallback is transmitted and UL scheduling information (UL Grant) may be transmitted according to a predefined reference UL HARQ timeline.

Figure 12:
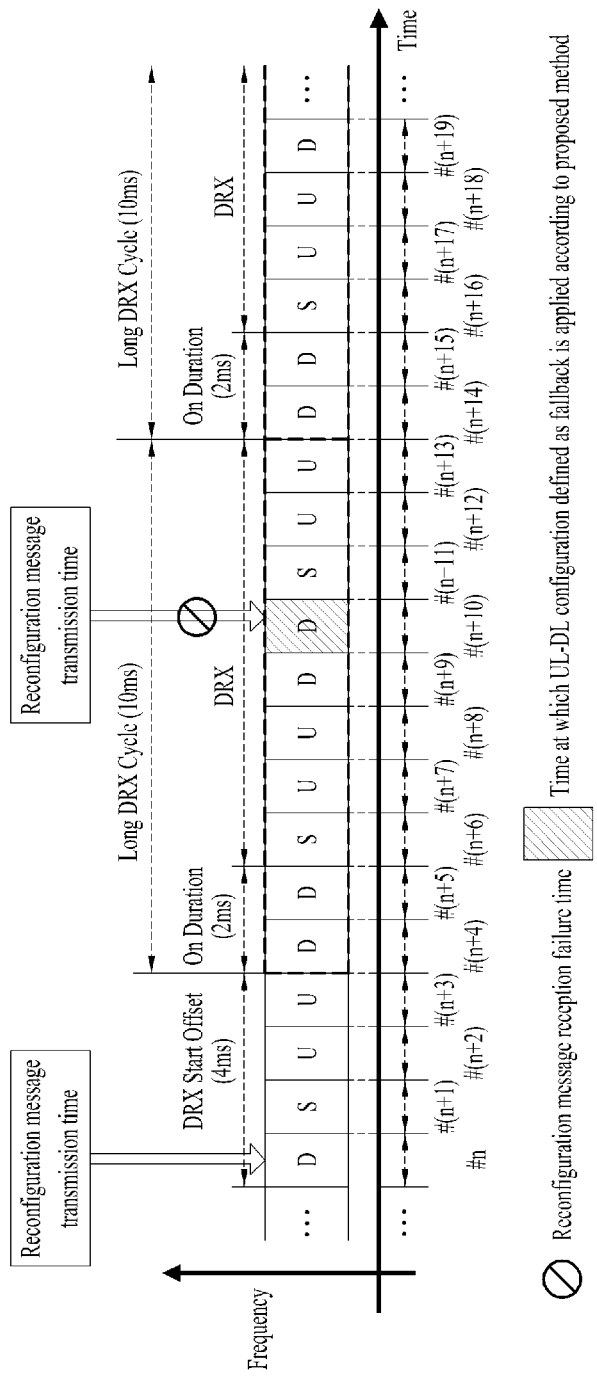
FIG. 12 is a reference diagram illustrating a second embodiment of the present invention.

FIG. 12 illustrates a case of application of this embodiment in the situation of FIG. 10. In the second embodiment, if the UE has failed to successfully receive a reconfiguration message at the time corresponding to SF #(n+10) due to DRX operation or DRX configuration, the UE may assume a UL-DL configuration defined as fallback (i.e., a UL-DL configuration on an SIB (i.e., UL-DL configuration #1 (DSUUDDSUUD))), in contrast with the case of FIG. 10.

Hereinafter, a description will be given of a method to recognize configuration of subframes and efficiently solve an issue of ambiguity on the DRX operation in a case where the UE has failed to successfully receive a reconfiguration message due to DRX operation/DRX configuration.

Figure 13:
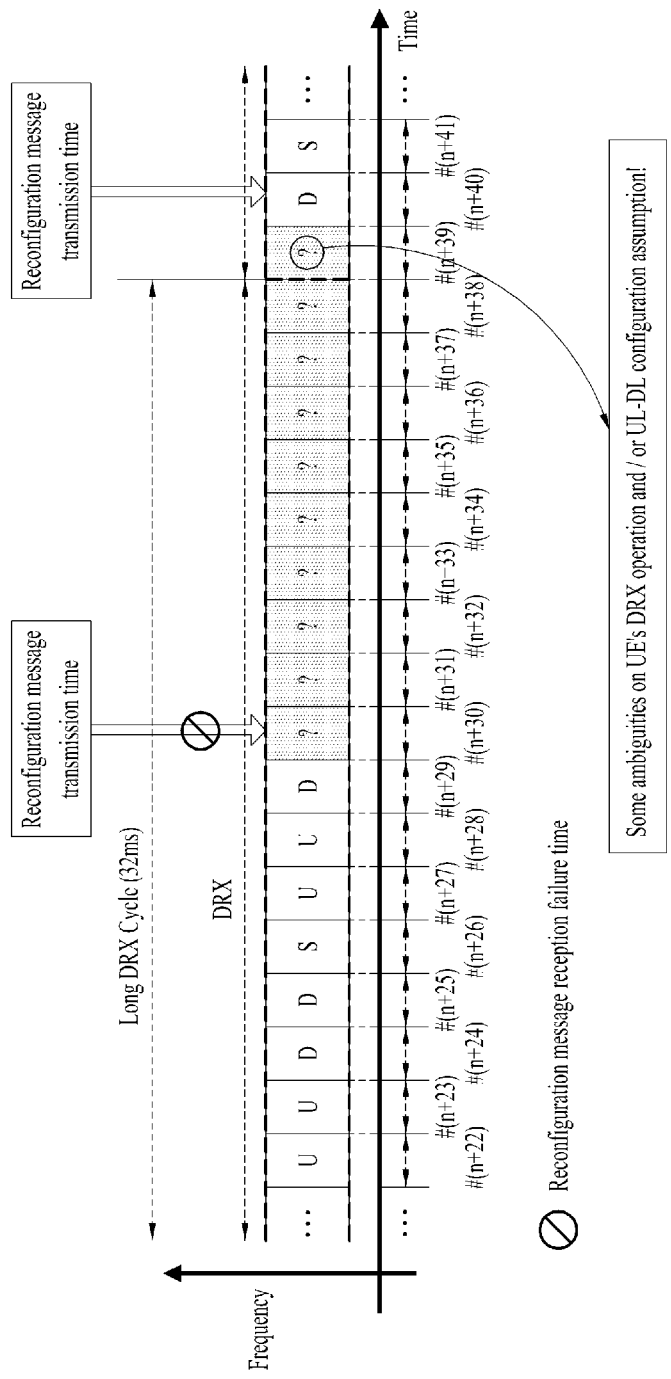
FIG. 13 illustrates another case where a UE fails to receive a reconfiguration message from an eNB due to DRX configuration.

FIG. 13 illustrates another case where a UE fails to receive a reconfiguration message from an eNB due to DRX configuration. In FIG. 13, a legacy UL-DL configuration established through an SIB signal is assumed to be UL-DL configuration #1 (i.e., DSUUDDSUUD), and an eNB is assumed to transmit a reconfiguration message to a UE based on a predefined period (e.g., 10 ms) and signal form. In addition, it is assumed that the Long DRX Cycle, onDurationTimer, and DRX Start Offset are set to 32 ms, 3 ms, and 7 ms, respectively.

In FIG. 13, it is assumed that the UE performs a DRX operation (for PDCCH Monitoring Activity (for UE's C-RNTI, TPC-PUCCH-RNTI, TPC-PUSCH-RNTI, and SPS C-RNTI)) until SF #(n+38) and that a reconfiguration message transmitted at SF #(n+30) (in order to announce uses of the subframes appearing in an interval from SF #(n+30) to SF #(n+39)) is not been successfully received. In this case, the UE cannot clearly recognize configurations of the subframes appearing in the interval from SF #(n+30) to SF #(n+39). Further, the UE may not accurately perform a new Long DRX Cycle operation that is applied from the time corresponding to SF #(n+39) (namely, the UE may not accurately count onDurationTimer due to unclear use of a subframe at SF #(n+39)).

Embodiment 3

Therefore, according to a third embodiment, if the UE fails to successfully receive a reconfiguration message due to DRX operation or DRX configuration, the DRX operation or DRX configuration may be additionally applied in subframes associated with the reconfiguration message or subframes whose configurations are determined by the reconfiguration message.

In addition, if the UE fails to successfully receive a reconfiguration message due to DRX operation or DRX configuration, the DRX operation or DRX configuration may be additionally applied before an earliest subframe in which the operation of monitoring a specific control channel related to an RNTI of the reconfiguration message is (actually) performed or before the reconfiguration message is successfully received later.

Herein, this embodiment may be applied only when the UE fails to successfully receive the reconfiguration message due to the DRX interval or DRX operation or only when the reception time of the reconfiguration message belongs to the DRX interval. That is, if the UE does not fails to receive the reconfiguration message due to the DRX interval or DRX operation (e.g., Short DRX) or the reception time of the reconfiguration message does not belong to the DRX interval, this embodiment may not be applied (namely, the DRX interval is not additionally extended).

For example, the operation of monitoring a specific control channel related to the RNTI of the reconfiguration message may be performed in a specific DL subframe/special subframe in which PDCCH/EPDCCH belonging to an onDurationTimer interval (or On Duration interval) is transmitted. Herein, the specific DL subframes/special subframes in which PDCCH/EPDCCH belonging to the onDurationTimer interval is transmitted may be i) DL/special subframes belonging to a static resource set, ii) DL/special subframes on an SIB, iii) DL/special subframes on a UL-DL configuration of a reference UL HARQ timeline, or iv) DL/special subframes on a UL-DL configuration of a reference DL HARQ timeline.

When this embodiment is applied, if an additionally configured DRX interval includes a part of the onDurationTimer interval (or a part of the On Duration interval) (i.e., L subframes) on a subsequent DRX Cycle, the counting operation of the onDurationTimer may be configured by i) subtracting (or counting) L from onDurationTimer of the subsequent DRX Cycle, ii) subtracting (or counting), from onDurationTimer of the subsequent DRX Cycle, a value corresponding to the number of DL subframes/special subframes included in the corresponding L subframes, iii) subtracting (or counting), from onDurationTimer of the subsequent DRX Cycle, a value corresponding to the number of DL subframes/special subframes on a UL-DL configuration of an SIB included in the corresponding L subframes, iv) subtracting (or counting), from onDurationTimer of the subsequent DRX Cycle, a value corresponding to the number of DL subframes/special subframes on a UL-DL configuration of a reference UL HARQ timeline included in the corresponding L subframes, v) subtracting (or counting), from onDurationTimer of the subsequent DRX Cycle, a value corresponding to the number of DL subframes/special subframes on a UL-DL configuration of a reference DL HARQ timeline included in the corresponding L subframes, or vi) subtracting (or counting), from onDurationTimer of the subsequent DRX Cycle, a value corresponding to the number of DL subframes/special subframes on a UL-DL configuration designated by a reconfiguration message included in the corresponding L subframes.

Additionally, when the aforementioned embodiment is applied, if an additionally configured DRX interval includes a part of the onDurationTimer interval (or a part of the On Duration interval) (i.e., L subframes) on a subsequent DRX Cycle, the counting operation of the onDurationTimer may be configured such that the corresponding L subframes are excluded, and then the counting operation is (newly) performed in consideration of downlink subframes and/or special subframes in which a predetermined control channel on a predefined UL-DL configuration is transmitted.

Herein, the predefined UL-DL configuration related to the counting operation of the onDurationTimer on the DRX Cycle may be defined as i) a UL-DL configuration on an SIB, ii) a UL-DL configuration of a (predefined) reference UL HARQ timeline, iii) a UL-DL configuration of a (predefined) reference DL HARQ timeline, or iv) a UL-DL configuration designated by a reconfiguration message.

Further, embodiments of the present invention may also be applied to i) a case where the result of CRC performed on the received reconfiguration message turns out to be False, ii) a case where the reconfiguration message is missed, or iii) a case where the result of CRC performed on the received reconfiguration message turns out to be True, but the corresponding information is not correctly delivered (i.e., False Alarm) (e.g., if a reconfiguration message detected by the UE instructs change of a DL subframe on an SIB to a UL subframe although the DL subframe on the SIB has been configured not to change to a UL subframe (in consideration of the RRM/RLM operation of a legacy UE), False Alarm may be determined).

Figure 14:
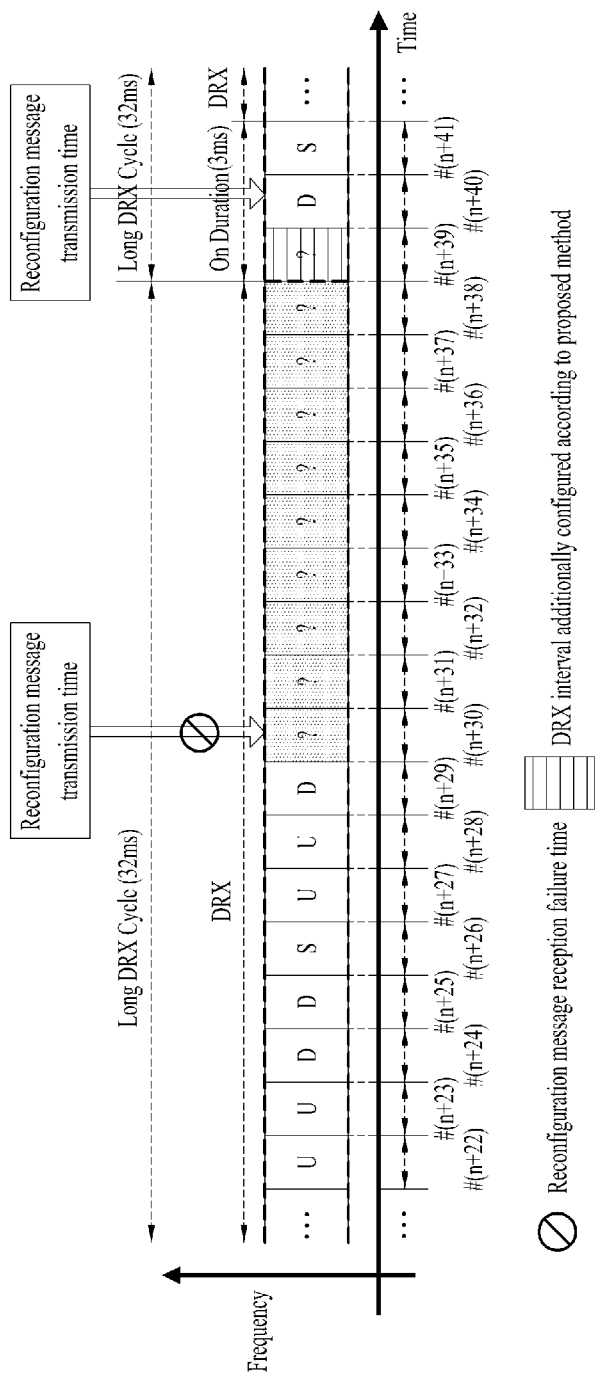
FIG. 14 is a reference diagram illustrating a third embodiment of the present invention.

FIG. 14 is a reference diagram illustrating application of this embodiment in the situation of FIG. 13. In FIG. 14, the UE fails to successfully receive a reconfiguration message at the time corresponding to SF #(n+10) due to DRX operation or DRX configuration, and thus the DRX operation or DRX configuration is additionally applied in a subframe at the time of SF #(n+39) according to this embodiment. In FIG. 14, since an additionally configured DRX interval includes a part of the onDurationTimer interval (or a part of the On Duration interval) on a subsequent DRX Cycle (i.e., 1 subframe), the UE subtracts (counts down) 1 from onDurationTimer of the subsequent DRX Cycle.

Embodiment 4

According to the present invention, if the UE performs the DRX operation or is set to the DRX mode, only a predefined specific UL-DL configuration rather than a UL-DL configuration designated by a reconfiguration message may be (constantly) assumed. For example, the predefined specific UL-DL configuration i) a UL-DL configuration on an SIB ii) a UL-DL configuration of a (predefined) reference UL HARQ timeline, or iii) a UL-DL configuration of a (predefined) reference DL HARQ timeline.

According to this embodiment, if the UE performs the DRX operation or is set to the DRX mode, this may be interpreted as meaning i) that application of a UL-DL configuration designated by the reconfiguration message is omitted ii) that monitoring of a specific control channel related to the RNTI of the reconfiguration message is not performed, or iii) that blind detection of the reconfiguration message is not performed.

Embodiment 5

According to a fifth embodiment of the present invention, when an eNB dynamically changes configuration S of radio resources according to system load thereof (namely, when the dynamic change mode for configuration of radio resources is set), the eNB may deliver information about a dynamic reconfiguration period of radio resources and/or subframe offset information to which reconfiguration information is applied to the UE through a predefined signal. Herein, the predefined signal may have the form of a higher layer signal (e.g., RRC/MAC/PBCH/SIB) or a physical layer signal (e.g., PDCCH/EPDCCH/PDSCH). In addition, the information about a dynamic reconfiguration period of radio resources and/or the subframe offset information to which reconfiguration information may be transmitted via a signal for delivering a reconfiguration message. Accordingly, when this embodiment is applied, the UE may recognize information about the time at which the reconfiguration message is received. Thereby, possibility of False Alarm/missing reception of the reconfiguration message may be reduced.

The reconfiguration period for radio resources may be set only to a multiple of the DRX Cycle (e.g., Long DRX Cycle or Short DRX Cycle). Herein, the subframe offset to which the reconfiguration information is applied may be defined to be set only to i) the value of "drxStartOffset" or "(drxStartOffset) modulo(shortDRX-Cycle)", ii) a value greater than or equal to the value of "drxStartOffset" or "(drxStartOffset) modulo(shortDRX-Cycle)", iii) a value less than or equal to the value of "drxStartOffset" or "(drxStartOffset) modulo (shortDRX-Cycle)", iv) a value less than or equal to the value of onDurationTimer, or v) a value greater than or equal to the value of onDurationTimer.

Embodiment 6

According to a sixth embodiment of the present invention, a reconfiguration message may be repeatedly transmitted at determined positions while the content thereof is maintained for a predefined period.

Figure 15A:
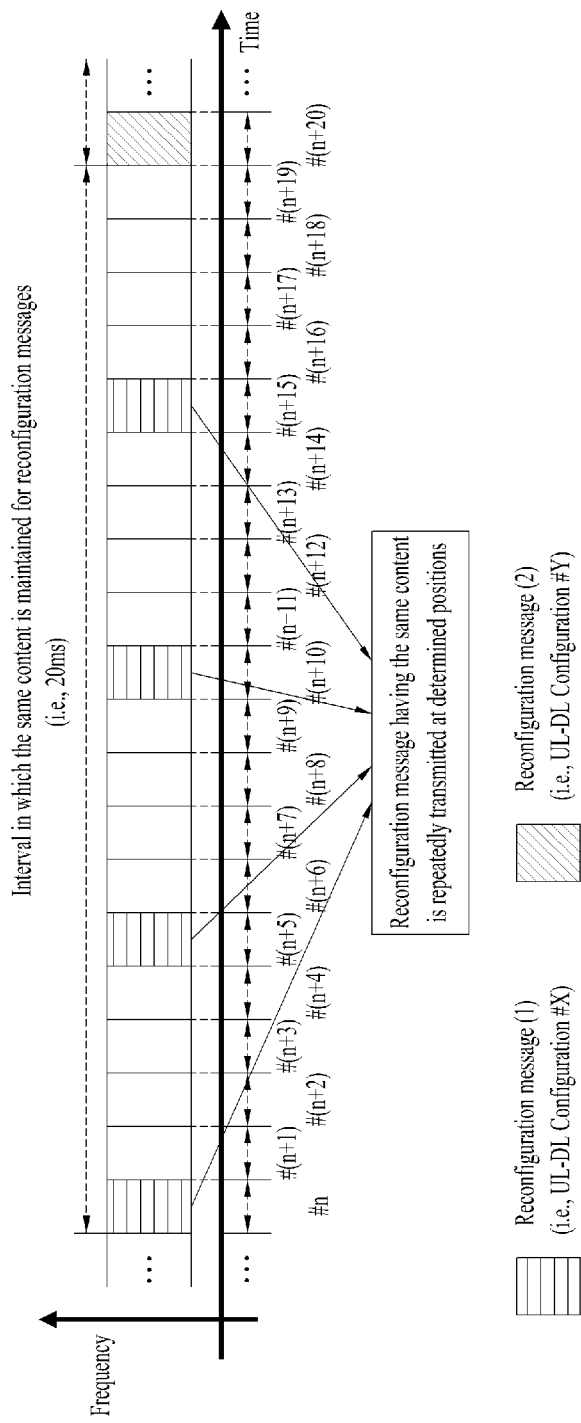
FIGS. 15 to 17 are reference diagrams illustrating a sixth embodiment of the present invention.

FIG. 15 is a reference diagram illustrating a method for transmitting a reconfiguration message according to a sixth embodiment of the present invention. In FIG. 15A, it is assumed that a period for which the same content is maintained in reconfiguration messages is 20 ms. That is, the reconfiguration messages transmitted at SF #n, SF #(n+5), SF #(n+10) and SF #(n+15) have the same content (i.e., UL-DL Configuration #X). In addition, the reconfiguration messages (i.e., UL-DL Configuration #X) transmitted at SF #n, SF #(n+5), SF #(n+10) and SF #(n+15) deliver configuration information about subframes corresponding to an interval from SF #(n+20) to SF #(n+39) (namely, UL-DL Configuration #X is repeatedly applied in the interval from SF #(n+20) to SF #(n+39)). In this case, the transmission method for the reconfiguration messages is similar to the legacy PBCH transmission method.

Figure 15C:
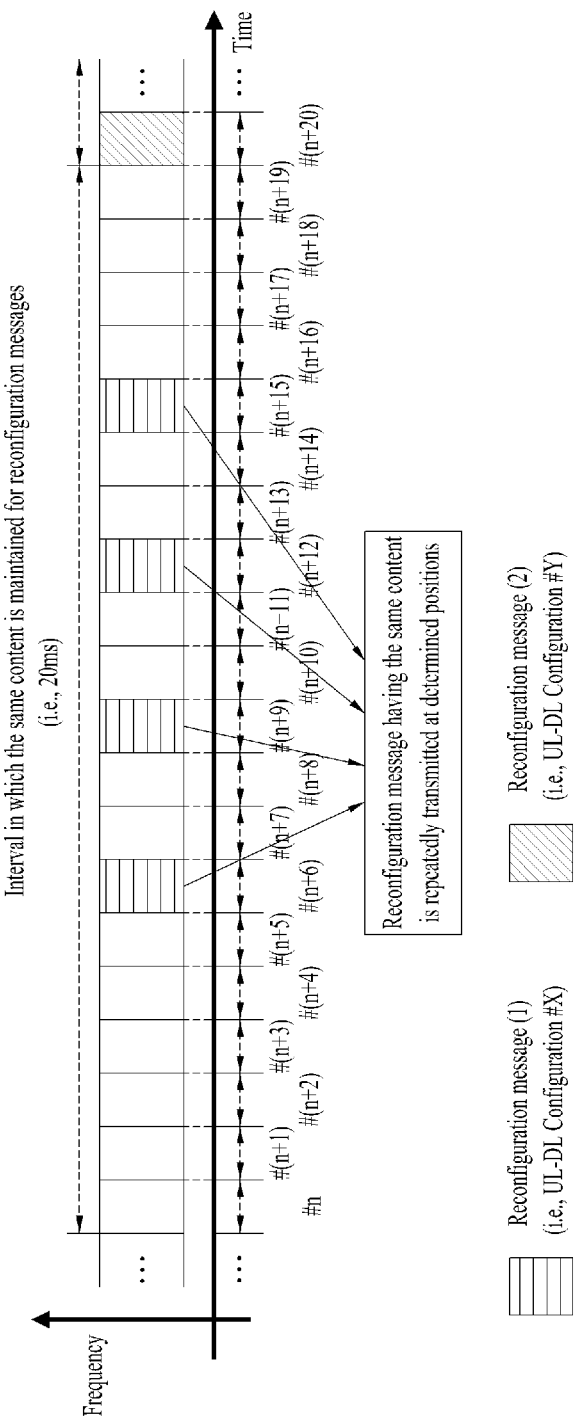

In FIG. 15A, positions at which a reconfiguration message having the same content is repeatedly transmitted may be predetermined according to a predefined configuration/rule, or may be predefined for the UE through separate signaling. Accordingly, it is apparent that this embodiment is also applicable when various positions of the reconfiguration messages are provided as shown in FIG. 15B or 15C.

In addition, the eNB may deliver, to the UE, information about a period for which the same content is maintained in reconfiguration messages and/or information about positions at which the reconfiguration message is repeatedly transmitted for a corresponding period through a predefined signal (e.g., a higher layer signal (SIB/PBCH/MAC/RRC) or a physical layer signal (e.g., PDCCH/EPDCCH/PDSCH)). Herein, reconfiguration messages having the same content may be repeatedly transmitted at a predefined interval (e.g., window). Accordingly, the reconfiguration messages having the same content may be defined as messages having the same information in a field set to be actually monitored by a specific UE among the fields of the reconfiguration messages.

According to this embodiment, events in which the user fails to receive a reconfiguration message due to DRX configuration or DRX operation may be relatively reduced. Additionally, the method for transmitting a reconfiguration message based on this embodiment may relatively increase the probability of successful reception of the reconfiguration messages and or relatively decrease the probability of False Alarm/missed reception.

Figure 16:
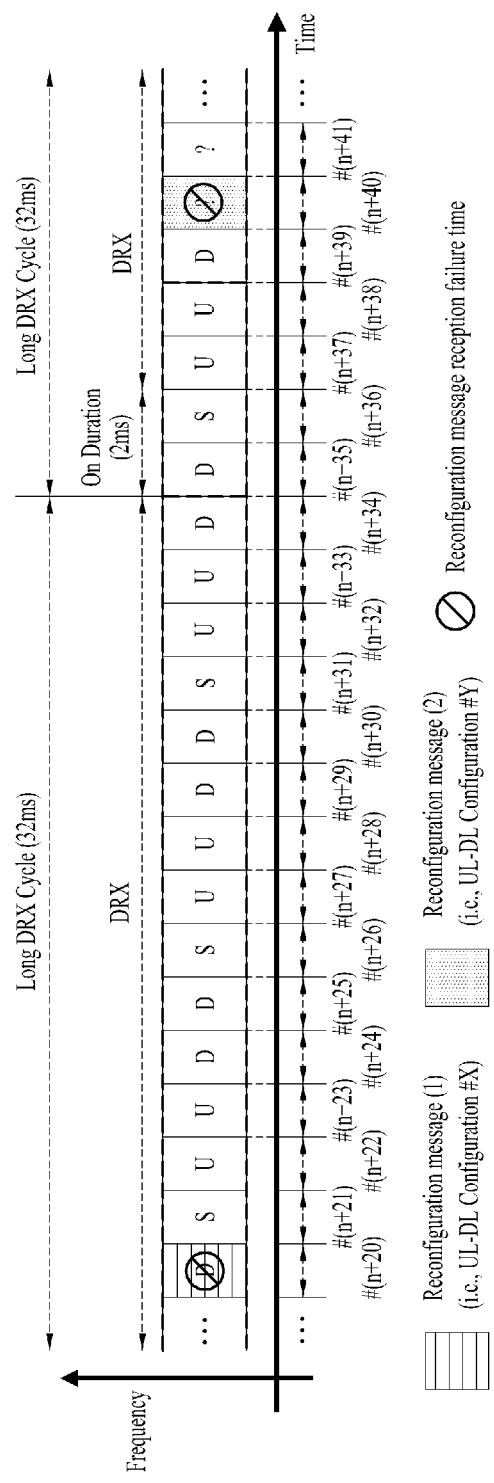
Figure 17:
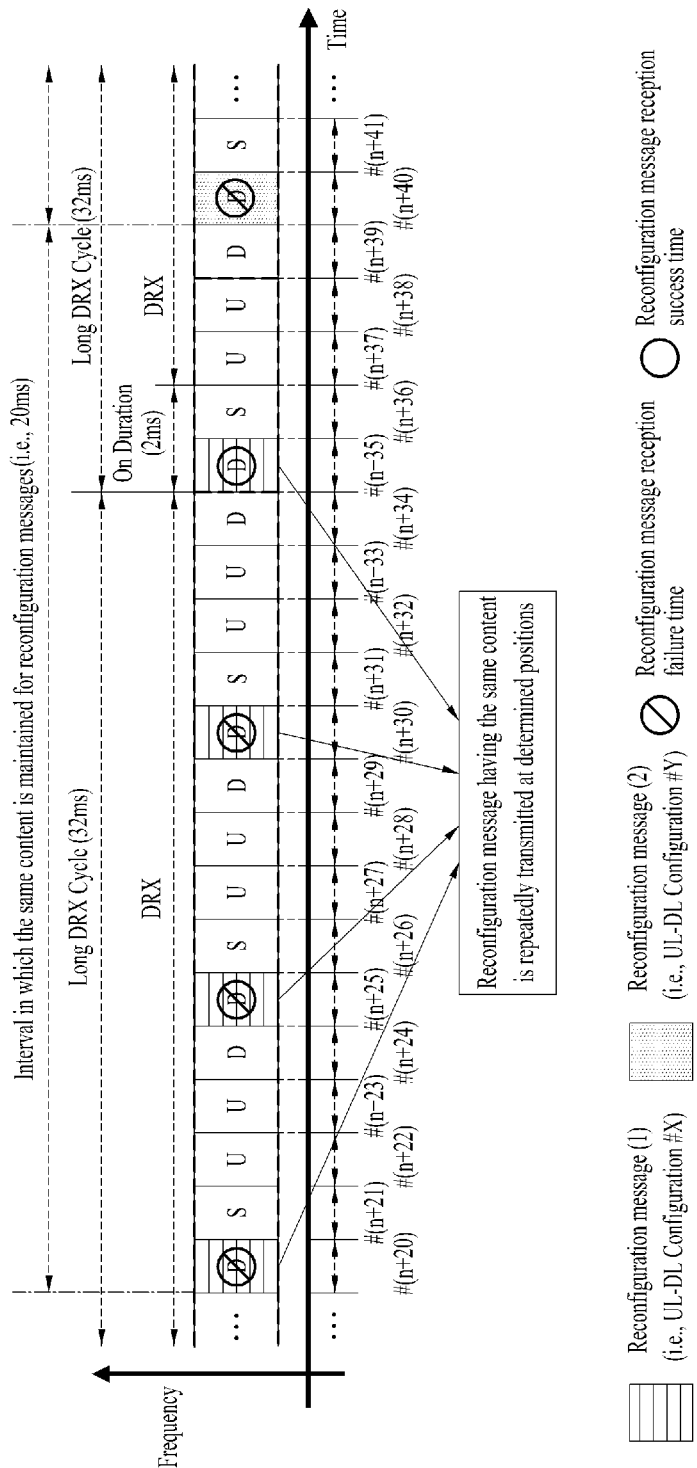

FIGS. 16 and 17 are reference diagrams illustrating a case where a UE fails to receive a reconfiguration message transmitted from an eNB due to DRX configuration and application of the sixth embodiment in this case.

FIG. 16 illustrates a case where a UE fails to receive a reconfiguration message transmitted from an eNB due to DRX configuration. In FIG. 16, it is assumed that a legacy UL-DL configuration established through an SIB signal is UL-DL configuration #1 (i.e., DSUUDDSUUD) and that the eNB transmits a reconfiguration message to the UE based on a predefined period (e.g., 20 ms) and signal form (for example, signaling may be limited to a DL/special subframes on a UL-DL configuration through the SIB signal). In addition, it is assumed that the DRX Cycle, onDurationTimer, and DRX Start Offset are set to 32 ms, 2 ms, and 3 ms, respectively.

In FIG. 16, the UE fails to receive reconfiguration messages transmitted at the time corresponding to SF #(n+20) (which is used to signal configurations of subframes coming in an interval between SF #(n+40) and SF #(n+59)) and the time corresponding to SF #(n+40) (which is used to signal configurations of subframes coming in an interval between SF #(n+60) and SF #(n+79)) due to DRX operation or DRX configuration.

FIG. 17 illustrates application of an embodiment of the present invention in the same situation as in FIG. 16. In FIG. 17, it is assumed that a period for which the same content is maintained in reconfiguration messages is 20 ms. Thereby, the reconfiguration messages transmitted at SF #(n+20), SF #(n+25), SF #(n+30), and SF #(n+35) have the same content (i.e., UL-DL Configuration #X). In addition, the reconfiguration messages (i.e., UL-DL Configuration #X) transmitted at SF #(n+20), SF #(n+25), SF #(n+30), and SF #(n+35) deliver configuration information about subframes corresponding to an interval from SF #(n+40) to SF #(n+59) (namely, UL-DL Configuration #X is repeatedly applied in the interval from SF #(n+40) to SF #(n+59)).

If the present invention is applied as shown in FIG. 17, the UE may successfully receive a reconfiguration message (i.e., UL-DL Configuration #X) delivering configuration information about subframes corresponding to an interval from SF #(n+40) to SF #(n+59) in SF #(n+35) (i.e., in the onDurationTimer interval (or a part of the On Duration interval)), in contrast with FIG. H.

Embodiment 7

According to a seventh embodiment of the present invention, if the UE is performing the DRX operation at the time when the UE should receive a reconfiguration message, the UE may stop the DRX operation and receive the reconfiguration message. Herein, the operation according to this embodiment may be interpreted as implying that reception of a reconfiguration message precedes the DRX operation in order of priority.

In addition, if the UE stops the DRX operation and receives a reconfiguration message based on the proposed method, i) the DRX operation may not be performed in the remaining part of the DRX interval after the corresponding time, ii) the remaining part of the DRX interval after the corresponding time may be assumed to be the Active Time interval, or iii) the DRX operation configuration may be disabled after the corresponding time.

Figure 18:
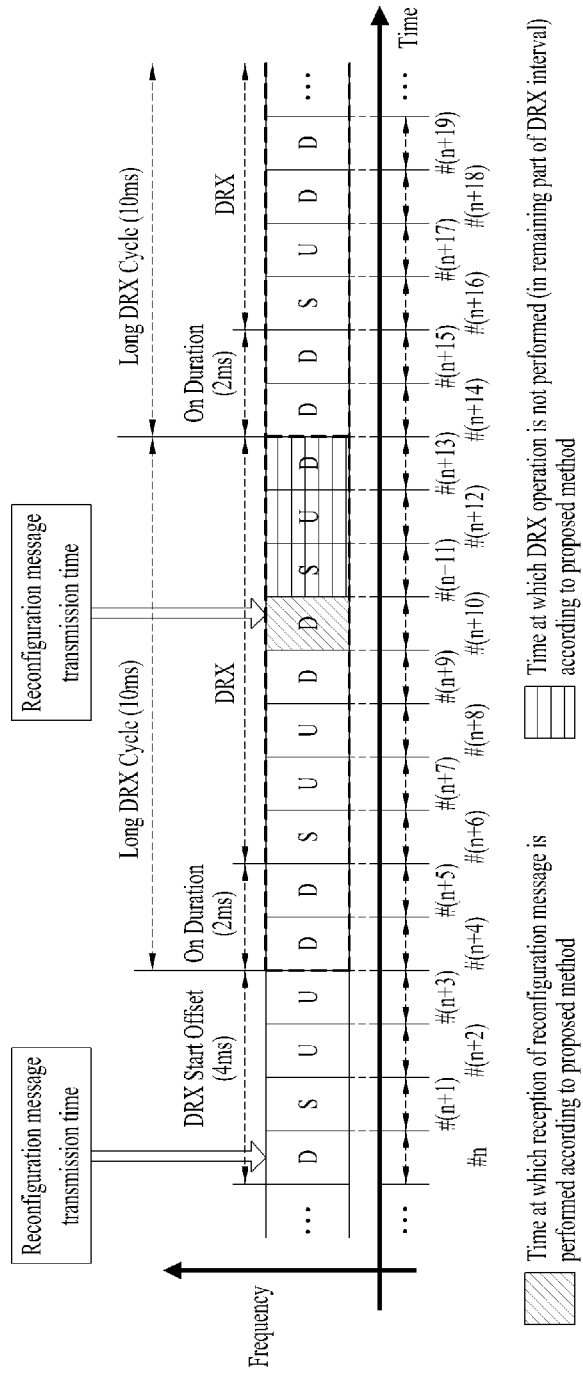
FIG. 18 is a reference diagram illustrating a seventh embodiment of the present invention.

FIG. 18 illustrates application of this embodiment in the same situation as in FIG. 10. The UE receives a reconfiguration message (i.e., UL-DL configuration #2 (i.e., DSUDDDSUDD)) in SF #(n+10) belonging to the DRX interval, and does not perform the DRX operation in the remaining part of the DRX interval (i.e., SF #(n+11), SF #(n+12), and SF #(n+13)) after SF #(n+10). Further, the seventh embodiment of the present invention may be applied together with the third embodiment described above.

Further, some or all of the first to seventh embodiments described above may be applied only to some predefined cases or some predefined parameters. The some predefined cases include the following examples.

Embodiments of the present invention may be applied only in order to implement counting of a specific timer (i.e., onDurationTimer and/or drx-InactivityTimer and/or drx-RetransmissionTimer).

Embodiments of the present invention may be applied only for a specific type of DRX Cycle (i.e., Long DRX Cycle and/or Short DRX Cycle).

Embodiments of the present invention may be applied only when the Active Time (if a DRX cycle is set) is set in consideration of some predefined cases (among, for example, "Time while onDurationTimer or drx-InactivityTimer or drx-RetransmissionTimer or mac-ContentionResolutionTimer is running", "Time while a Scheduling Request is sent on PUCCH and is pending", "Time while an uplink grant for a pending HARQ retransmission can occur and there is data in the corresponding HARQ buffer", and "Time while a PDCCH indicating a new transmission addressed to the C-RNTI of the UE has not been received after successful reception of a Random Access Response for the preamble not selected by the UE").

Embodiments of the present invention may be restrictively applied according to whether or not a predefined reference signal (e.g., CRS and/or CSI-RS) is transmitted in DL subframes/special subframes in a flexible resource set (namely, possibility of transmission of a specific control channel (e.g., PDCCH) or possibility of setting a specific transmission mode (TM) is determined) or according to the type of an established TM applied in the DL subframes/special subframes in a flexible resource set (for example, the embodiments may be restrictively applied only when a TM (e.g., TM 4) requiring CRS-based decoding of a DL data channel (PDSCH) is set up).

Embodiments of the present invention may be applied only when the dynamic reconfiguration mode for radio resources is set.

Embodiments of the present invention may be applied only to a specific control channel type (e.g., PDCCH and/or EPDCCH)-based DRX operation.

Embodiments of the present invention may be applied only in the RRC_CONNECTED mode (and/or IDLE mode) of the UE.

Embodiments of the present invention may be applied only in communication in a specific direction (e.g., DL communication and/or UL communication).

Hereinafter, description of a method for allowing a UE to efficiently perform discontinuous reception (DRX) when multiple cells dynamically change configurations of radio resources according to system load thereof.

When an eNB dynamically changes configurations of radio resources according to system load thereof (namely, the dynamic reconfiguration mode for radio resources is set), there may be ambiguities of subframes which should be considered in counting specific timers related to the DRX operation. Herein, the specific timers related to the DRX operation include onDurationTimer, drx-InactivityTimer, and drx-RetransmissionTimer as described above. The ambiguity problem may also occur when the UE fails to successfully receive a reconfiguration message from the eNB or when a CRS is configured not to be transmitted in a DL subframe/special subframe belonging to a flexible resource set (e.g., a subframe which serves as a UL subframe on an SIB but, is used by being reconfigured as a DL subframe SIB) (namely, PDCCH transmission is impossible).

Figure 19:
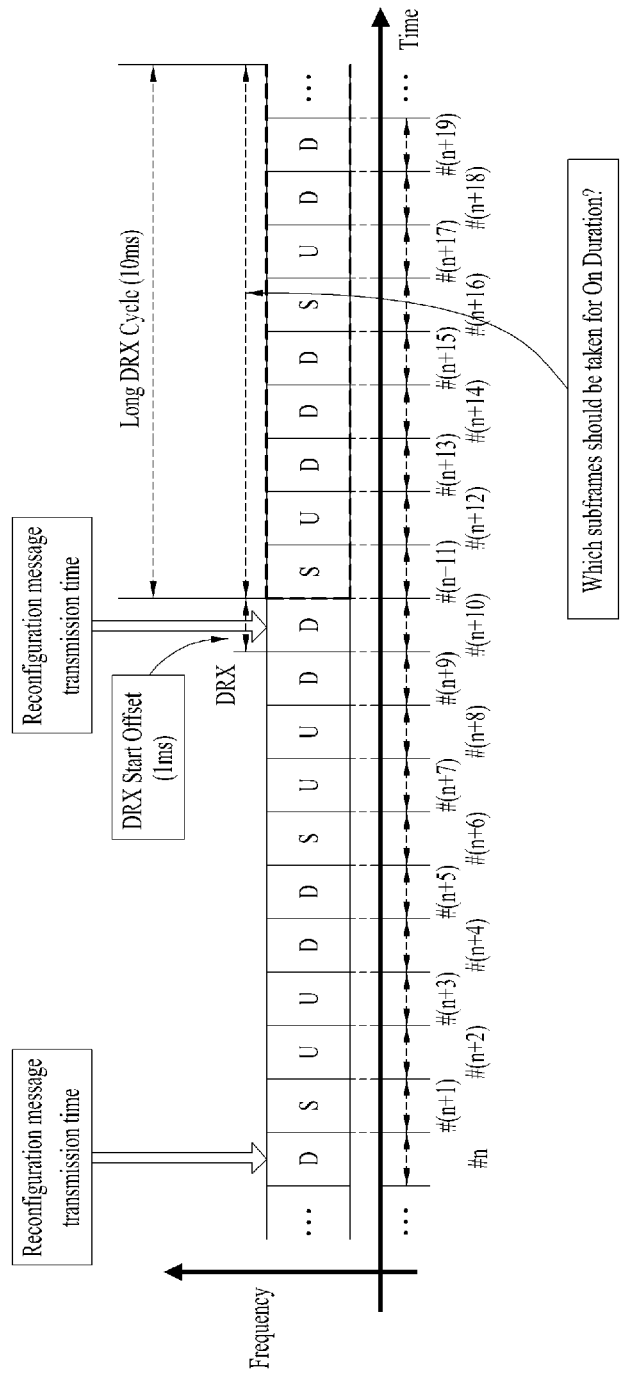
FIGS. 19 and 20 are reference diagrams illustrating an ambiguity issue in a legacy system.

FIG. 19 is a reference diagram illustrating an ambiguity issue in a legacy system. In FIG. 19, it is assumed that the legacy UL-DL configuration established through an SIB signal is UL-DL configuration #1 (i.e., DSUUDDSUUD) and that the eNB transmits a reconfiguration message to the UE based on a predefined period (e.g., 10 ms) and signal form. In FIG. 19, it is assumed that UL-DL configuration #1 is changed to UL-DL configuration #2 (i.e., DSUDDDSUDD) by the reconfiguration message at SF #(n+10) and that the Long DRX Cycle, onDurationTimer, and DRX Start Offset are set to 10 ms, 2 ms, and 1 ms, respectively.

As shown in FIG. 19, when a reconfiguration message is transmitted, configurations of radio resources dynamically change, and accordingly an ambiguity issue is raised regarding subframes which should be considered in counting onDurationTimer.

Figure 20:
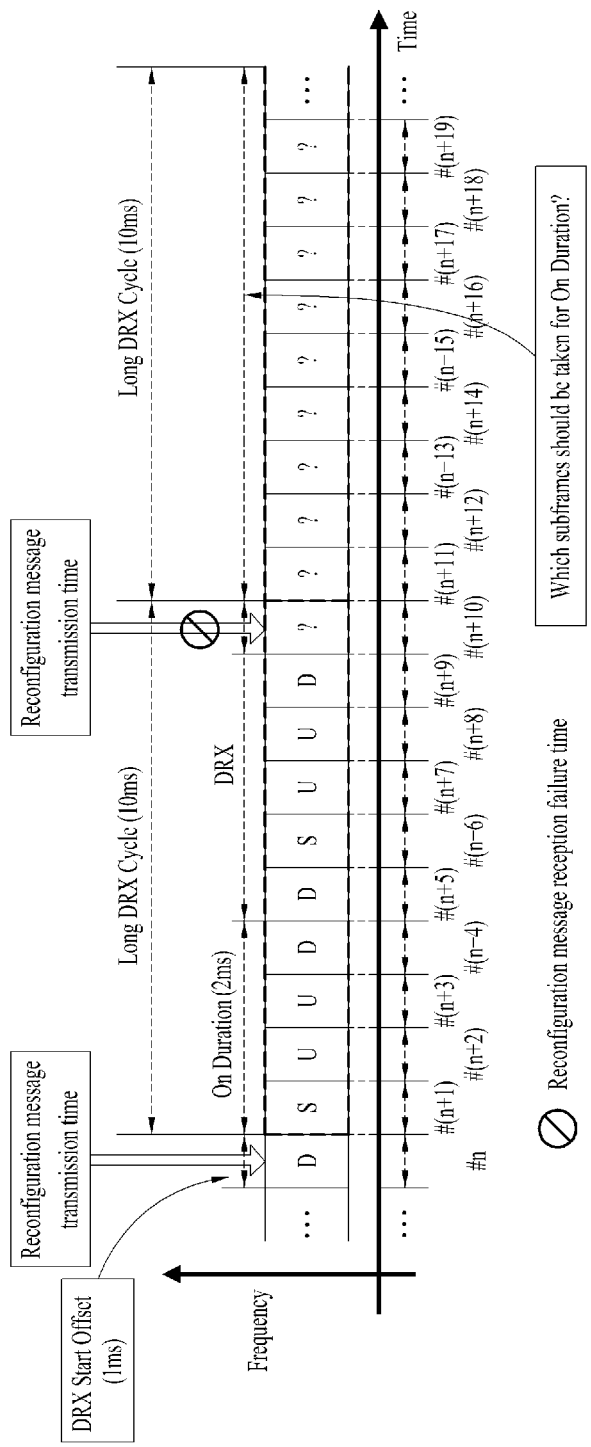

FIG. 20 illustrates a case where an ambiguity issue is raised in the legacy system. In FIG. 20, it is assumed that the legacy UL-DL configuration established through an SIB signal is UL-DL configuration #1 (i.e., DSUUDDSUUD) and that the eNB transmits a reconfiguration message to the UE based on a predefined period (e.g., 10 ms) and signal form. In FIG. 20, it is assumed that the UE fails to receive the reconfiguration message transmitted from the eNB at the time corresponding to SF #(n+10) due to DRX operation or DRX configuration and that the Long DRX Cycle, onDurationTimer, and DRX Start Offset are set to 10 ms, 2 ms, and 1 ms, respectively.

As shown in FIG. 20, whether reception of the reconfiguration message is missed, an ambiguity issue is raised regarding subframes which should be considered in counting onDurationTimer.

Hereinafter, description will be given of a method for efficiently supporting discontinuous reception (DRX) of a UE when an eNB dynamically changes configurations of radio resources according to system load thereof (namely, when the dynamic reconfiguration mode for the radio resources is set).

Embodiment 8

According to an eighth embodiment of the present invention, when the eNB dynamically changes configurations of radio resources according to system load thereof (namely, when the dynamic reconfiguration mode for radio resources is set), specific timers related to the DRX operation (i.e., onDurationTimer, drx-InactivityTimer, and drx-RetransmissionTimer) may be counted in consideration of only downlink subframes and/or special subframes (special subframes including DwPTS) on an SIB on which a predefined control channel is transmitted. That is, according to this embodiment, the DRX operation is not affected by whether or not a reconfiguration message is successfully received. Herein, the control channel may be defined as the legacy PDCCH or EPDCCH.

Figure 21:
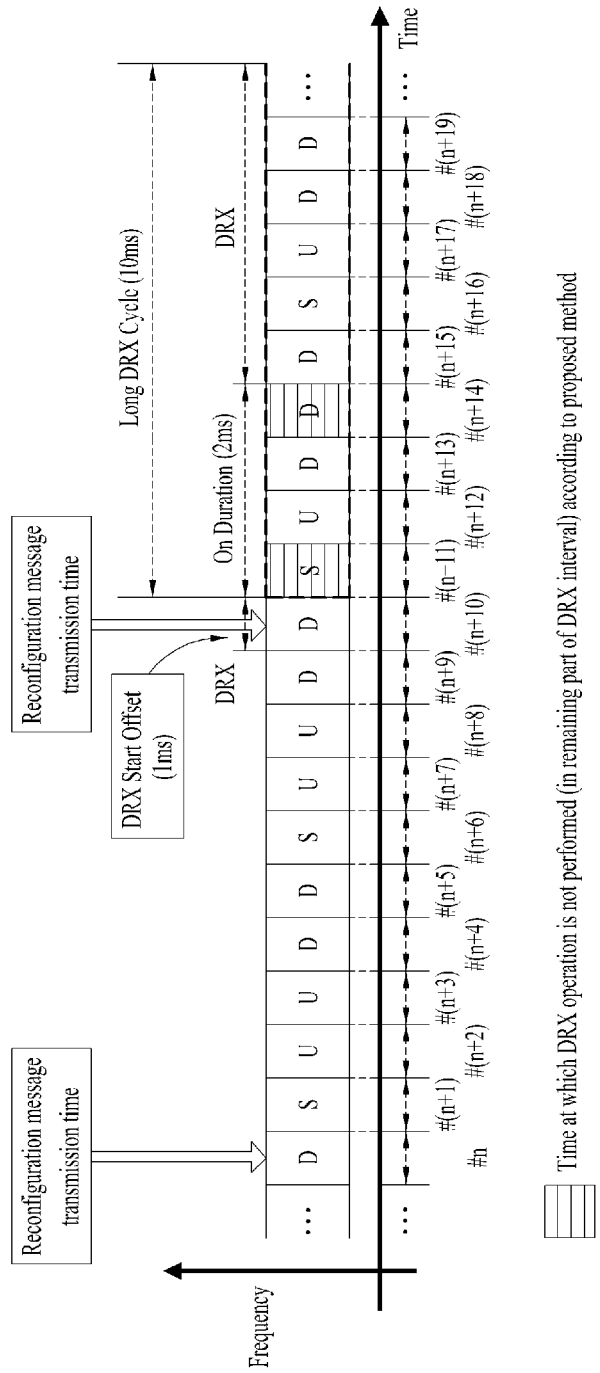
FIG. 21 is a reference diagram illustrating an eighth embodiment of the present invention.

FIG. 21 illustrates application of this embodiment in the same situation as in FIG. 19. According to this embodiment, subframes corresponding to counting of onDurationTimer (i.e., 2 ms) in FIG. 21 are a special subframe at the time corresponding to SF #(n+11) in which PDCCH/EPDCCH is transmitted and a downlink subframe at the time corresponding to SF #(n+14) in which PDCCH/EPDCCH is transmitted.

The subframes in which a PDCCH/EPDCCH belonging to the onDurationTimer interval (or On Duration interval) may be defined to be a special subframe of SF #(n+11), a downlink subframe of SF #(n+13) and a downlink subframe of SF #(n+14) or to be a special subframe of SF #(n+11) and a downlink subframe of SF #(n+14).

This embodiment may be applied only when the UE fails to successfully receive a reconfiguration message. For example, this embodiment may be applied only when i) the result of CRC performed on the received reconfiguration message turns out to be False, ii) the reconfiguration message is missed (e.g., when the reconfiguration message is transmitted in a DRX-applied interval of the UE), or iii) the result of CRC performed on the received reconfiguration message turns out to be True, but the corresponding information is not correctly delivered (i.e., False Alarm).

In addition, when an eNB dynamically changes configurations of radio resources according to system load thereof (namely, the dynamic reconfiguration mode for radio resources is set), specific timers related to the DRX operation (i.e., onDurationTimer, drx-InactivityTimer, and drx-RetransmissionTimer) may be counted in consideration of only i) downlink subframes and/or special subframes on the UL-DL configuration of a (predefined) reference UL HARQ timeline or ii) downlink subframes and/or special subframes on the UL-DL configuration of a (predefined) reference DL HARQ timeline in which a predefined control channel is transmitted.

Embodiment 9

According to this embodiment, when the eNB dynamically changes configurations of radio resources according to system load thereof (namely, when the dynamic reconfiguration mode for radio resources is set), specific timers related to the DRX operation (i.e., onDurationTimer, drx-InactivityTimer, and drx-RetransmissionTimer) may be counted in consideration of downlink subframes and/or special subframes in which a predefined control channel is transmitted and which are configured by a reconfiguration message. Herein, the control channel may be defined as the legacy PDCCH/EPDCCH.

Figure 22:
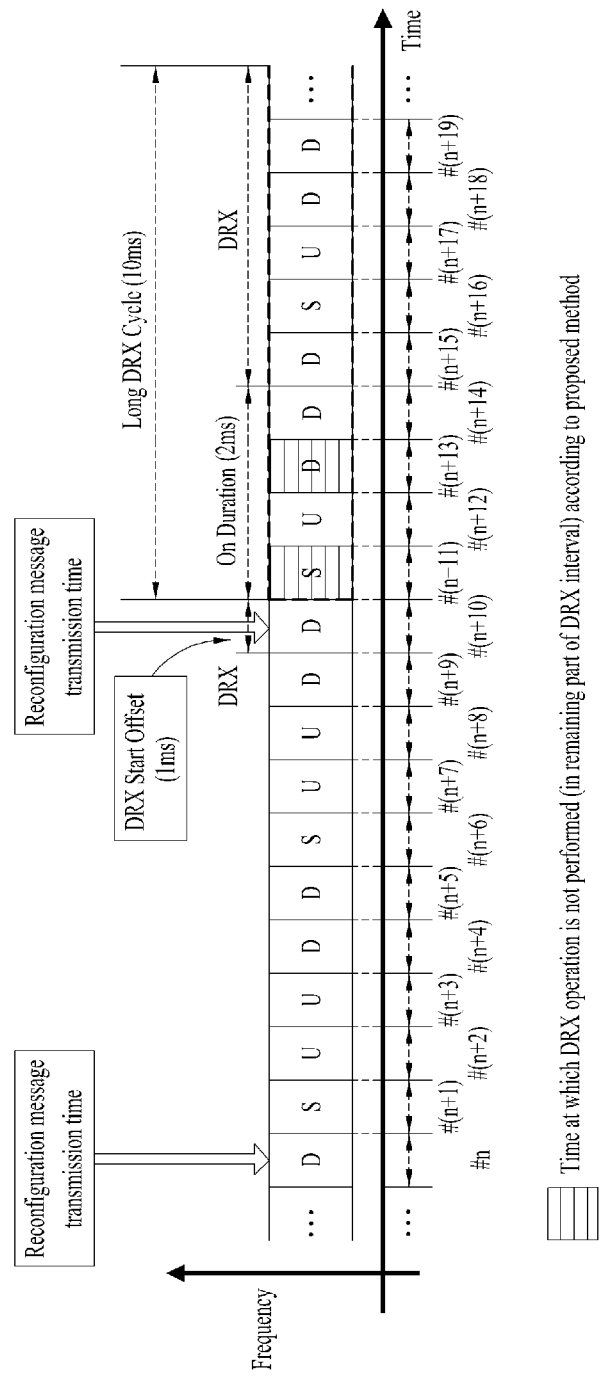
FIG. 22 is a reference diagram illustrating a ninth embodiment of the present invention

FIG. 22 illustrates application of this embodiment in the same situation as in FIG. 19. In FIG. 22, subframes corresponding to counting of onDurationTimer (i.e., 2 ms) are a special subframe of SF #(n+11) in which a PDCCH/EPDCCH is transmitted and a downlink subframe of SF #(n+13) in which a PDCCH/EPDCCH is transmitted. The subframes in which a PDCCH/EPDCCH belonging to the onDurationTimer interval (or On Duration interval) may be defined to be a special subframe of SF #(n+11) and a downlink subframe of SF #(n+13). Further, this embodiment may be applied only when the UE successively receives the reconfiguration message.

Embodiment 10

When the eighth embodiment and the ninth embodiment are applied, specific timers related to the DRX operation (i.e., onDurationTimer, drx-InactivityTimer, and drx-RetransmissionTimer) are counted in consideration of only downlink subframes and/or special subframes on an SIB in which a predefined control channel (e.g., PDCCH/EPDCCH) is transmitted as described in the eighth embodiment, or are counted in consideration of downlink subframes and/or special subframes which are configured by a reconfiguration message and in which a predefined control channel (e.g., PDCCH/EPDCCH) is transmitted. However, in this case, i) subframes in which the UE actually performs blind decoding (BD) in PDCCH/EPDCCH for DL scheduling information (DL Grant) or UL scheduling information (UL Grant) (related to initial transmission and/or retransmission) may be a set of DL subframes/special subframes configured by the reconfiguration message, or ii) subframes in which the UE performs BD of the UL scheduling information (UL Grant) or DL scheduling information (DL Grant) may be limited to downlink subframes/special subframes which are configured by the reconfiguration message and in which the UL scheduling information (UL Grant) may be transmitted according to a predefined reference UL HARQ timeline.

For example, an operation in the interval of the Active Time (including the time while onDurationTimer, drx-InactivityTimer or drx-RetransmissionTimer is running) may be performed depending on whether or not corresponding conditions are satisfied in the downlink subframes/special subframes defined for BD of the DL/UL scheduling information or depending on whether or not the scheduling information is actually received in the downlink subframes/special subframes defined for BD of the DL/UL scheduling information. That is, when the aforementioned DRX is configured, operation performed by the UE for each subframe may be (re)configured as follows.

For a PDCCH-subframe, if the subframe is neither required for uplink transmission for half-duplex FDD UE operation, nor a part of a configured measurement gap during the Active Time,
the UE monitors PDCCH or EPDCCH.
If the PDCCH or EPDCCH indicates DL transmission or DL assignment has been configured for this subframe, the UE starts the HARQ RTT Timer for the corresponding HARQ process; and
the UE stops the drx-RetransmissionTimer for the corresponding HARQ process.
If the PDCCH or EPDCCH indicates new (DL or UL) transmission,
the UE starts or restarts drx-InactivityTimer.

That is, in this embodiment, the operations of starting the HARQ/RTT timer, stopping the drx-RetransmissionTimer and (re-)starting the Drx-InactivityTimer in the active time interval may be performed according to whether or not the DL/UL scheduling information is actually received in the DL subframes/special subframes defined for BD of the scheduling information.

According, if the reconfiguration message is successfully received, a specific timer (e.g., onDurationTimer) related to the DRX operation complies with the UL-DL configuration on the SIB, while monitoring of a control channel complies with the UL-DL configuration established by the reconfiguration message. Therefore, the number of PDCCH-subframe(s) within the value of the specific time related to the DRX operation may differ from the number of actually monitored PDCCH-subframe(s) (i.e., the number of be configured downlink/special subframes). That is, the actual number of PDCCH-subframe(s) within the value of the specific timer related to the DRX operation may be greater than a predefined number of PDCCH-subframe(s) within the value of the specific timer related to the DRX operation.

Specifically, according to this embodiment, in the situation of FIG. 21 to which the eighth embodiment described above is applied, the UE defines subframes belonging to the On Duration interval (subframes in which PDCCH/EPDCCH is transmitted or BD of scheduling information is performed) to be "a specific subframe of SF #(n+11), a downlink subframe of SF #(n+13), and a downlink subframe of SF #(n+14), and performs the operation of (re-)starting the drx-InactivityTimer depending on whether or not scheduling information (e.g., DL Grant and/or UL Grant) is actually received in the subframes in the On Duration interval according to this embodiment. In addition, this embodiment may be applied only when the UE successfully receives the reconfiguration message.

Additionally, whether or not to perform an operation in the interval of the Active Time (including the time while onDurationTimer, drx-InactivityTimer or drx-RetransmissionTimer is running) may be determined i) depending on whether or not corresponding conditions are satisfied in DL subframes/special subframes on the SIB among the downlink subframes/special subframes defined for BD of the DL/UL scheduling information or ii) depending on whether or not the scheduling information is actually received in the downlink subframes/special subframes defined for BD of the DL/UL scheduling information.

According to this embodiment, in the situation of FIG. 21 to which the eighth embodiment described above is applied, the UE performs the operation of (re-)starting drx-InactivityTimer depending on whether or not scheduling information (e.g., DL Grant and/or UL Grant) is actually received in "a special subframe of SF #(n+11) and a downlink subframe of SF #(n+14)," which are a subframe/special subframe that belong (only) to the On Duration interval (i.e., subframes in which PDCCH/EPDCCH is transmitted or BD of the scheduling information is performed) and are on the SIB.

This embodiment may be applied only when the UE fails to successively receive a reconfiguration message. For example, this embodiment may be applied only when i) the result of CRC performed on the received reconfiguration message turns out to be False, ii) the reconfiguration message is missed (e.g., when the reconfiguration message is transmitted in a DRX-applied interval of the UE), or iii) the result of CRC performed on the received reconfiguration message turns out to be True, but the corresponding information is not correctly delivered (i.e., False Alarm).

Embodiment 11

According to an eleventh embodiment, when the eNB dynamically changes configurations of radio resources according to system load thereof (namely, when the dynamic reconfiguration mode for radio resources is set), transmission of a DRX Command MAC Control Element (CE) related to the operation of stopping onDurationTimer and/or stopping drx-InactivityTimer is performed.

The operation of stopping onDurationTimer or transmitting a DRX Command MAC CE may be performed only in a downlink subframe (/a special subframe) of a static resource set. That is, the probability of False Alarm of the DRX Command MAC CE may be reduced, and stable transmission of the DRX Command MAC CE is possible.

Alternatively, the operation may be performed only in a downlink subframe (/a special subframe) of a flexible resource set. That is, the probability of False Alarm of the DRX Command MAC CE may be reduced.

Alternatively, the operation may be performed in DL subframes/special subframes of the static resource set and the flexible resource set.

Embodiment 12

According to this embodiment, when the dynamic reconfiguration mode for radio resources is applied, management of at least one parameter related to the DRX operation/DRX configuration (e.g., a time related to the DRX operation (e.g., onDurationTimer, drx-InactivityTimer, drx-RetransmissionTimer)) and/or an operation of triggering at least one event related to the DRX operation/DRX configuration (e.g., an operation in the interval of Active Time (including the time while onDurationTimer or drx-InactivityTimer or drx-RetransmissionTimer is running)) may be performed based on a predefined specific control channel (e.g., a downlink subframe and/or special subframe in which the specific control channel is transmitted). Herein, the specific control channel may be limited to a PDCCH, or a PDCCH and an EPDCCH/EPDCCH.

Management of at least one parameter related to the DRX operation/DRX configuration and/or the operation of triggering at least one event related to the DRX operation/DRX configuration may be interpreted as being performed based on a common control channel regardless of the resource type (e.g., a static resource type or a flexible resource type).

Alternatively, management of at least one parameter related to the DRX operation/DRX configuration and/or the operation of triggering at least one event related to the DRX operation/DRX configuration may be performed based on different control channels for respective resource types (e.g., static resource type or flexible resource type). For example, for the static resource type (static subframe set), management of at least one parameter related to the DRX operation/DRX configuration and/or the operation of triggering at least one event related to the DRX operation/DRX configuration may be performed based on the PDCCH. For the flexible resource type (flexible subframe set), management of at least one parameter related to the DRX operation/DRX configuration and/or the operation of triggering at least one event related to the DRX operation/DRX configuration may be performed based on the EPDCCH.

Embodiment 13

At least one of the eighth to twelfth embodiments may be applied only to some predefined cases or some parameters. The eighth to twelfth embodiments may be restrictively applied as follows.

The embodiments may be applied only for counting of a specific timer (i.e., onDurationTimer and/or drx-InactivityTimer and/or drx-RetransmissionTimer).

The embodiments may be applied only for a DRX Cycle of a specific type (i.e., Long DRX Cycle and/or Short DRX Cycle).

The embodiments may be applied only when the Active Time (if a DRX cycle is set) is set in consideration of some predefined cases (among, for example, "Time while onDurationTimer or drx-InactivityTimer or drx-RetransmissionTimer or mac-ContentionResolutionTimer is running", "Time while a Scheduling Request is sent on PUCCH and is pending", "Time while an uplink grant for a pending HARQ retransmission can occur and there is data in the corresponding HARQ buffer", and "Time while a PDCCH indicating a new transmission addressed to the C-RNTI of the UE has not been received after successful reception of a Random Access Response for the preamble not selected by the UE").

The embodiments may be restrictively applied according to whether or not a predefined reference signal (e.g., CRS and/or CSI-RS) is transmitted in DL subframes/special subframes in a flexible resource set. That is, possibility of transmission of a specific control channel (e.g., PDCCH) or possibility of setting a specific transmission mode (TM) is determined depending on whether or not a predefined reference signal is transmitted, and accordingly the embodiments may be restrictively applied in consideration of this possibility.

The embodiments may be restrictively applied according to the type of an established TM applied in the DL subframes/special subframes in a flexible resource set. For example, the embodiments may be restrictively applied only when a TM (e.g., TM 4) requiring CRS-based decoding of a DL data channel (PDSCH) is set up.

The embodiments of the present invention may be applied only when the dynamic reconfiguration mode for radio resources is set.

The embodiments of the present invention may be applied only to a specific control channel type (e.g., PDCCH and/or EPDCCH)-based DRX operation.

The embodiments of the present invention may be applied only in the RRC_CONNECTED mode (and/or IDLE mode) of the UE.

The proposed methods may be applied only in communication in a specific direction (e.g., DL communication and/or UL communication).

Is apparent that description/details of embodiments described above may be considered as embodiments since they may also be included in one of the implemented methods of the present invention. The embodiments described herein may be independently implemented or a combination thereof may be implemented. The eNB may deliver, to the UE, information about the rules/configurations in the embodiments described above or information about whether or not the rules/configurations are applied, through a predefined signal (e.g., a physical layer signal or a higher layer signal). In addition, the method proposed herein may be applied only in a PCell or SCell where the dynamic reconfiguration mode for radio resources is set.

Figure 23:
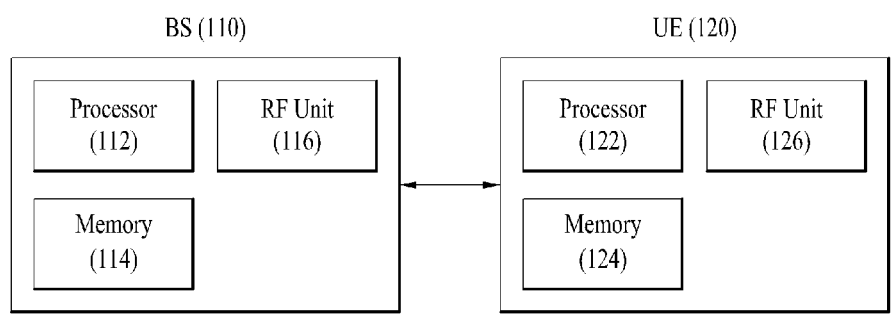
FIG. 23 illustrates a BS and a UE which are applicable to an embodiment of the present invention.

FIG. 23 illustrates a BS and a UE which are applicable to an embodiment of the present invention.

When a wireless communication system includes a relay, communication on a backhaul link is performed between the BS and the relay, and communication on an access link is performed between the relay and the UE. Accordingly, the BS or the UE illustrated in the figure may be replaced by the relay according to the situation.

Referring to FIG. 23, a wireless communication system includes a BS 110 and a UE 120. The BS 110 includes a processor 112, a memory 114, and a radio frequency (RF) unit 116. The processor 112 may be configured to implement the procedures and/or methods proposed herein. The memory 114 is connected to the processor 112 and stores various kinds of information related to operation of the processor 112. The RF unit 116 is connected to the processor 112 and transmits and/or receives a radio signal. The UE 120 includes a processor 122, a memory 124, and an RF unit 126. The processor 122 may be configured to implement procedures and/or methods proposed herein. The memory 124 is connected to the processor 122 and stores various kinds of information related to operation of the processor 122. They RF unit 126 is connected to the processor 122 and transmits and/or receives a radio signal. The BS 110 and/or the UE 120 may have a single antenna or multiple antennas.

The embodiments described below are constructed by combining elements and features of the present invention in a predetermined form. The elements or features should be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment. It is apparent that claims that are not explicitly cited in each other in the appended claims may be presented in combination as an embodiment of the present invention or included as a new claim by subsequent amendment after the application is filed.

In this specification, a specific operation described as being performed by a BS may be performed by an upper node in some cases. That is, it is apparent that various operations performed for communication with a UE in a network constituted by a plurality of network nodes including a BS may be performed by the BS or other network nodes. The term 'BS' may be replaced with the term 'fixed station', 'Node B', 'eNode B (eNB)', 'Access Point (AP)', etc.

The embodiments of the present invention may be implemented through various means, for example, hardware, firmware, software, or a combination thereof. When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, or the like.

When implemented by firmware or software, an embodiment of the present invention may be embodied as a module, a procedure, or a function that performs the functions or operations described above. Software code may be stored in a memory unit and executed by a processor.

The memory unit is located at the interior or exterior of the processor and may transmit and receive data to and from the processor via various known means.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein.

INDUSTRIAL APPLICABILITY

A method and apparatus for supporting discontinuous reception in a wireless communication system supporting reconfiguration of radio resources have been described above focusing on exemplary application thereof to a 3GPP LTE system. However, the method and apparatus may also be applied to various wireless communication systems other than the 3GPP LTE system.

The invention claimed is:

1. A method for detecting control information by a User Equipment (UE) in a wireless communication system, the method comprising:
receiving first information associated with a first uplink-downlink (UL-DL) configuration through a system information block (SIB);
receiving second information associated with a second UL-DL configuration through a Physical Downlink Control Channel (PDCCH); and
monitoring a PDCCH during an on-duration time on a downlink subframe and a special subframe indicated by the second UL-DL configuration, the on-duration time is counted based on a downlink subframe and a special subframe indicated by the first UL-DL configuration,
wherein the first and second UL-DL configurations indicate a pattern of 10 subframes, and the pattern of 10 subframes is a combination of an uplink subframe, a downlink subframe, and a special subframe.

2. The method according to claim 1, wherein radio resources indicated by the first UL-DL configuration are reconfigured based on the second UL-DL configuration.

3. The method according to claim 1, wherein the first UL-DL configuration is a time division duplex (TDD) configuration transmitted through the SIB, and
wherein the second UL-DL configuration is a TDD configuration transmitted through a PDCCH.

4. The method according to claim 1, wherein the second information is received periodically through a PDCCH.

5. The method according to claim 1, wherein an inactivity time and a retransmission time are counted based on the first UL-DL configuration.

6. A User Equipment (UE) for detecting control information in a wireless communication system supporting reconfiguration of radio resources, the UE comprising:
a transceiver; and
a processor coupled to the transceiver,
wherein the processor is configured to:
control the transceiver to receive first information associated with a first uplink-downlink (UL-DL) configuration through a system information block (SIB),
control the transceiver to receive second information associated with a second UL-DL configuration through a Physical Downlink Control Channel (PDCCH), and
monitor a PDCCH during an on-duration time on a downlink subframe and a special subframe indicated by the second UL-DL configuration, the on-duration time is counted based on a downlink subframe and a special subframe indicated by the first UL-DL configuration,
wherein the first and second UL-DL configurations indicate a pattern of 10 subframes, and the pattern of 10 subframes is a combination of an uplink subframe, a downlink subframe, and a special subframe.

7. The UE according to claim 6, wherein the first UL-DL configuration is a time division duplex (TDD) configuration transmitted through the SIB, and
wherein the second UL-DL configuration is a TDD configuration transmitted through a PDCCH.

8. The UE according to claim 6, wherein the second information is received periodically through a PDCCH.

9. The UE according to claim 6, wherein an inactivity time and a retransmission time are counted based on the first UL-DL configuration.

* * * * *